United States Patent
Siomina et al.

(10) Patent No.: US 9,585,104 B2
(45) Date of Patent: Feb. 28, 2017

(54) PERFORMING INTER-FREQUENCY MEASUREMENTS ON CARRIERS WITH OVERLAPPING BANDWIDTHS

(71) Applicant: Telefonaktiebolaget L M Ericsson (publ), Stockholm (SE)

(72) Inventors: Iana Siomina, Täby (SE); Bengt Lindoff, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/782,061

(22) PCT Filed: Sep. 27, 2013

(86) PCT No.: PCT/SE2013/051122
§ 371 (c)(1),
(2) Date: Oct. 2, 2015

(87) PCT Pub. No.: WO2014/168538
PCT Pub. Date: Oct. 16, 2014

(65) Prior Publication Data
US 2016/0057708 A1    Feb. 25, 2016

Related U.S. Application Data

(60) Provisional application No. 61/809,548, filed on Apr. 8, 2013.

(51) Int. Cl.
H04W 52/24    (2009.01)
H04B 17/345   (2015.01)
(Continued)

(52) U.S. Cl.
CPC ........ H04W 52/243 (2013.01); H04B 17/345 (2015.01); H04W 52/244 (2013.01);
(Continued)

(58) Field of Classification Search
None
See application file for complete search history.

(56) References Cited

U.S. PATENT DOCUMENTS

2010/0234040 A1    9/2010   Palanki et al.
2012/0106472 A1    5/2012   Rosa et al.
(Continued)

FOREIGN PATENT DOCUMENTS

EP    1320212 A2       6/2003
WO    2009068727 A1    6/2009
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); User Equipment (UE) radio transmission and reception (Release 11)", Technical Specification, 3GPP TS 36.101 V11.4.0, Mar. 1, 2013, pp. 1-401, 3GPP, France.

(Continued)

Primary Examiner — Diane Mizrahi
(74) Attorney, Agent, or Firm — Coats and Bennett, PLLC

(57) ABSTRACT

The disclosure relates generally to interference coordination techniques for scenarios where two neighboring base stations transmit on different carrier frequencies having bandwidths that overlap at least in part. A network node determines radio resources in the overlapping portion of the bandwidths and controls or adjusts the transmission configuration of signals being transmitted in the overlapping portion of the bandwidths to reduce or avoid interference. The network node may also configure or request a wireless terminal to perform inter-frequency measurements in the overlapping portion of the bandwidths. In some embodiments, a wireless terminal determines radio resources in the (Continued)

overlapping portion of the bandwidths and performs measurements on the signal in the overlapping portion of the bandwidths.

16 Claims, 12 Drawing Sheets

(51) Int. Cl.
    *H04W 72/04*     (2009.01)
    *H04W 72/12*     (2009.01)
    *H04W 52/14*     (2009.01)

(52) U.S. Cl.
    CPC ... *H04W 72/0473* (2013.01); *H04W 72/1263* (2013.01); *H04W 52/143* (2013.01); *H04W 52/146* (2013.01)

(56) References Cited

U.S. PATENT DOCUMENTS

| | | |
|---|---|---|
| 2013/0235837 A1 | 9/2013 | Suo |
| 2013/0308481 A1 | 11/2013 | Kazmi et al. |
| 2014/0119265 A1 | 5/2014 | Shauh et al. |
| 2014/0146732 A1 | 5/2014 | Olufunmilola et al. |
| 2014/0185495 A1* | 7/2014 | Kuchibhotla ....... H04W 76/023 370/281 |
| 2014/0185530 A1* | 7/2014 | Kuchibhotla ....... H04W 76/023 370/329 |
| 2014/0334294 A1 | 11/2014 | Ericson et al. |
| 2016/0029379 A1* | 1/2016 | Kuchibhotla ....... H04W 76/023 370/329 |
| 2016/0036541 A1* | 2/2016 | Siomina ............... H04B 17/345 455/422.1 |

FOREIGN PATENT DOCUMENTS

| | | |
|---|---|---|
| WO | 2012065538 A1 | 5/2012 |
| WO | 2013048302 A1 | 4/2013 |
| WO | 2014168539 A1 | 10/2014 |

OTHER PUBLICATIONS

3rd Generation Partnership Project, "3rd Generation Partnership Project; Technical Specification Group Radio Access Network; Evolved Universal Terrestrial Radio Access (E-UTRA); Requirements for support of radio resource management (Release 11)", Technical Specification, 3GPP TS 36.133 V11.4.0, Mar. 1, 2013, pp. 1-676, 3GPP, France.

* cited by examiner

PERFORMING INTER-FREQUENCY MEASUREMENTS ON CARRIERS WITH OVERLAPPING BANDWIDTHS

TECHNICAL FIELD

The present disclosure relates generally to performance of measurements in a wireless communication network and, more particularly, to performance of inter-frequency measurements on carriers with overlapping bandwidths.

BACKGROUND

In Third Generation Partnership Project (3GPP) standards, heterogeneous network deployments have been defined as deployments where base stations of different transmit powers are placed throughout a macro-cell layout. Examples of low-power base stations include micro, pico, and femto base stations. Heterogeneous network deployments provide capacity extension in certain areas such as traffic hotspots. A traffic hotspot is a small geographical area with a higher user density and/or higher traffic intensity than the surrounding area. Placing a low power base station such as a pico base station at a traffic hotspot can adapt a network according to traffic needs and environment, thus enhancing the network's performance. However, interference characteristics in a heterogeneous deployment are significantly different than in a homogeneous deployment, in both downlink and uplink. Also in a heterogeneous network deployment, traffic distribution is often non-uniform and uplink transmissions generally experience high interference due to the co-existence of both small and large cells.

It is often challenging to ensure efficient network operation and superior user experience in a heterogeneous network deployment. One common problem related to heterogeneous networks is that it is often difficult for a wireless device to perform measurements on signals transmitted from a low-power base station in a heterogeneous network due to interference from neighboring high-power base stations. Yet accurate signal estimates and measurements are needed for important functionalities such as cell search, cell identification, handover, Radio Link Management (RLM) and Radio Resource Management (RRM), etc. The difficulty of the measurements is compounded in scenarios where cells providing overlapping coverage operate on different carrier frequencies.

SUMMARY

Exemplary embodiments of the disclosure comprise methods performed by a network node for controlling or adjusting a transmission configuration to reduce or avoid interference. According to one embodiment of the method, the network node determines a set of radio resources used for the transmission of second signals on a second carrier having a second carrier frequency and second bandwidth that interfere with first signals transmitted on a first carrier having a first carrier frequency different from the second carrier frequency and first bandwidth. The set of radio resources being within a portion of the second bandwidth that overlaps with the first bandwidth. The network node controls or adjusts a transmission configuration for one or more of the second signals to reduce the interference with the first signals in the set of radio resources.

In some embodiments, controlling or adjusting a transmission configuration is performed by the network node in response to at least one of: 1) an indication from a wireless terminal or another network node of the need to reduce interference caused by the second signals; and 2) an indication from a wireless terminal or another network node of the capability of the wireless terminal to mitigate interference in the overlapping part of the first and second bandwidths.

In some embodiments, determining a set of radio resources comprises determining the set of radio resources based on assistance data received from a second network node via a backhaul link.

In some embodiments, the assistance data comprises information about the transmission configuration of the second network node or timing of transmissions by the second network node.

In some embodiments, determining a set of radio resources comprises determining the set of radio resources based on assistance data received from a wireless terminal.

In some embodiments, the assistance data comprises transmission-related parameters for one or more neighbor cells, or measurement parameters used for measurement of signals transmitted by the neighbor cells.

In some embodiments, determining a set of radio resources comprises determining the set of radio resources based on radio transmissions received from a second network node.

In some embodiments, the first signals comprise synchronization signals reference signals, broadcast signals, or a combination thereof.

In some embodiments, controlling or adjusting a transmission configuration for one or more of the second signals comprises reducing the transmit power or adjusting the transmit timing of one or more of the second signals.

In some embodiments, reducing the transmit power of one or more of the second signals comprises reducing the transmit power for second signals comprising data and control signals but not for second signals comprising reference signals and synchronization signals.

In some embodiments, controlling or adjusting a transmission configuration for one or more of the second signals comprises rescheduling one or more of the second signals to avoid interference with the first signals.

In some embodiments, controlling or adjusting a transmission configuration for one or more of the second signals comprises muting one or more of the second signals.

In some embodiments, the method further comprises receiving an indication from a wireless terminal indicative of a high level of interference, and wherein the controlling or adjusting a transmission configuration for one or more of the second signals is preformed responsive to the indication.

Other embodiments of the disclosure comprise a network node that performs interference coordination. The network node in one embodiment comprises a network interface for communicating with other network nodes, and processing circuits connected to said network interface. The processing circuits include a transmission control circuit configured to determine a set of radio resources used for the transmission of second signals on a second carrier having a second carrier frequency and second bandwidth that interfere with first signals transmitted on a first carrier having a first carrier frequency different from the second carrier frequency and first bandwidth, the set of radio resources being within a portion of the second bandwidth that overlaps with the first bandwidth. The transmission control circuit is further configured to control or adjust a transmission configuration for one or more of the second signals to reduce the interference of the second signals with the first signals in the set of radio resource.

In some embodiments, the transmission control circuit is configured to control or adjust a transmission configuration for one or more of the second signals responsive to at least one of: 1) an indication from a wireless terminal or another network node of the need to reduce interference caused by the second signals; and 2) an indication from a wireless terminal or another network node of the capability of the wireless terminal to mitigate interference in the overlapping part of the first and second bandwidths.

In some embodiments, the transmission control circuit is configured to determine a set of radio resources by determining the set of radio resources based on information received from a second network node over a backhaul link.

In some embodiments, the information received from the second network node comprises information about the transmission configuration of the second network node, or the timing of transmission by the second network node.

In some embodiments, the transmission control circuit is configured to determine the set of radio resources based on assistance data received from a wireless terminal.

In some embodiments, the assistance data comprises transmission-related parameters for one or more neighbor cells, or measurement parameters used for measurement of signals transmitted by the neighbor cells.

In some embodiments, the transmission control circuit is configured to determine the set of radio resources based on radio transmissions received from a second network node.

In some embodiments, the first signals comprise synchronization signals reference signals, broadcast signals, or a combination thereof.

In some embodiments, the transmission control circuit is configured to control or adjust a transmission configuration for one or more of the second signals by reducing the transmit power of one or more of the second signals.

In some embodiments, the transmission control circuit is further configured to reduce the transmit power for second signals comprising data and control signals but not for second signals comprising reference signals and synchronization signals.

In some embodiments, the transmission control circuit is configured to control or adjust a transmission configuration for one or more of the second signals by rescheduling one or more of the second signals to avoid interference with the first signals.

In some embodiments, the transmission control circuit is configured to control or adjust a transmission configuration for one or more of the second signals by muting one or more of the second signals.

In some embodiments, the transmission control circuit is further configured to receive an indication from a wireless terminal indicative of a high level of interference, and wherein the controlling or adjusting a transmission configuration for one or more of the second signals by the transmission control circuit is preformed responsive to the indication.

In some embodiments, the network node comprises a base station.

In some embodiments, the network node comprises a core network node.

Other embodiments of the disclosure comprise methods performed by a wireless terminal for estimating or measuring a parameter. According to one embodiment of the method, the wireless terminal determines a set of radio resources used for the transmission of second signals on a second carrier having a second carrier frequency and second bandwidth that interfere with first signals transmitted on a first carrier having a first carrier frequency different from the second carrier frequency and first bandwidth. The radio resources may, for example, comprise a set of REs in an OFDM time-frequency grid. The set of radio resources are within a portion of the second bandwidth that overlaps with the first bandwidth. The wireless terminal obtains samples of a received signal received on the set of resources within the overlapping bandwidths. Based on the samples, the wireless terminal measures or estimates a parameter of the second signals.

In some embodiments, the method further comprises cancelling interference caused by the second signals when receiving the first signals or performing measurements on the first signals.

In some embodiments, the method further comprises cancelling interference caused by the first signals when receiving the second signals or performing measurements on the second signals.

In some embodiments, the method further comprises signaling to a network node one of: 1) an indication of the capability of the wireless device to handle inter-frequency interference in the overlapping portion s of the first and second bandwidths; and 2) an indication of the need to reduce interference in the overlapping portion of the first and second bandwidths.

In some embodiments, determining the set of radio resources comprises determining the set of radio resources based on assistance data received from a network node.

In some embodiments, the assistance data comprises information about the transmission configuration of the network node or timing of transmissions by the network node.

In some embodiments, determining the set of radio resources comprises determining the set of radio resources based on radio transmissions received from one or more network nodes.

In some embodiments, the method further comprises reporting the measured or estimated parameter to another network node in a measurement report.

In some embodiments, the measurement report includes an indication that the measurement was performed on a portion of the second bandwidth that overlaps with the first bandwidth.

In some embodiments, the measurement report indicates the measurement bandwidth for the measurements performed on the second signals.

In some embodiments, the method further comprises reducing interference in said first signals due to said second signals using said measured or estimated parameter to obtain reduced interference signals.

In some embodiments, the method further comprises measuring or estimating a parameter associated with the reduced interference signal.

In some embodiments, the method further comprises signaling, to another network node, a capability of performing inter-frequency measurements for the second signals within a portion of the second bandwidth that overlaps with the first bandwidth.

In some embodiments, the method further comprises adapting measurement parameters used to measure or estimate the parameter associated with the second signals.

In some embodiments, adapting measurement parameters comprises adapting a bandwidth of a measurement filter.

In some embodiments, the method further comprises scaling the estimated or measured parameter depending on the measurement bandwidth.

In some embodiments, the method further comprises buffering a set of samples corresponding to said first signals;

processing the buffered set of samples to frequency align the samples with a carrier grid for the second frequency carrier; and using the frequency aligned samples to perform the estimating or measuring of a parameter of the second signals.

In some embodiments, estimating or measuring of a parameter of the second signals is performed responsive to a request from a network node.

In some embodiments, estimating or measuring of a parameter of the second signals is performed responsive to a predetermined event or condition.

Yet other embodiments of the disclosure comprise a wireless terminal. IN one embodiment, the wireless terminal comprises transceiver circuits for communicating with network nodes in a wireless communication network, and processing circuits connected to said transceiver circuits. The processing circuits are configured to determine a set of radio resources used for the transmission of second signals on a second carrier having a second carrier frequency and second bandwidth that interfere with first signals transmitted on a first carrier having a first carrier frequency different from the second carrier frequency and first bandwidth, said set of radio resources being within a portion of the second bandwidth that overlaps with the first bandwidth. The processing circuits are configured to obtain samples of a received signal received on said set of radio resources, and measure or estimate a parameter associated with one or more of said second signals based on said samples.

In some embodiments, the processing circuits are further configured to cancel interference caused by the second signals when receiving the first signals or performing measurements on the first signals.

In some embodiments, the processing circuits are further configured to cancel interference caused by the first signals when receiving the second signals or performing measurements on the second signals.

In some embodiments, the processing circuits are further configured to signal to a network node one of: 1) an indication of the capability of the wireless device to handle inter-frequency interference in the overlapping portion s of the first and second bandwidths; and 2) an indication of the need to reduce interference in the overlapping portion of the first and second bandwidths.

In some embodiments, the processing circuits are further configured to determine the set of radio resources based on assistance data received from a network node.

In some embodiments, the assistance data comprises information about the transmission configuration of the network node or timing of transmissions by the network node.

In some embodiments, the processing circuits are further configured to determine the set of radio resources based on radio transmissions received from one or more network nodes.

In some embodiments, the processing circuits are further configured to report the measured or estimated parameter to another network node in a measurement report.

In some embodiments, the processing circuits are further configured to include in the measurement report an indication that the measurement was performed on a portion of the second bandwidth that overlaps with the first bandwidth.

In some embodiments, the processing circuits are further configured to include in the measurement report the measurement bandwidth for the measurements performed on the second signals.

In some embodiments, the processing circuits are further configured to reduce interference in said first signals due to said second signals using said measured or estimated parameter to obtain reduced interference signals.

In some embodiments, the processing circuits are further configured to measure or estimate a parameter associated with the reduced interference signal.

In some embodiments, the processing circuits are further configured to signal, to another network node, a capability of performing inter-frequency measurements for the second signals within a portion of the second bandwidth that overlaps with the first bandwidth.

In some embodiments, the processing circuits are further configured to adapt measurement parameters used to measure or estimate the parameter associated with the second signals.

In some embodiments, adapting measurement parameters by the processing circuits comprise adapting a bandwidth of a measurement filter.

In some embodiments, the processing circuits are further configured to scale the estimated or measured parameter depending on the measurement bandwidth.

In some embodiments, the processing circuits are further configured to buffer a set of samples corresponding to said first signals; process the buffered set of samples to frequency align the samples with a carrier grid for the second frequency carrier; and use the frequency aligned samples to perform the estimating or measuring of a parameter of the second signals.

In some embodiments, the estimating or measuring of a parameter of the second signals by the processing circuits are performed responsive to a request from a network node.

In some embodiments, the estimating or measuring of a parameter of the second signals by the processing circuits are performed responsive to a predetermined event or condition.

Still other embodiments of the disclosure comprise methods implemented in a network node of a wireless communication network of assisting a wireless terminal in performing estimation or measurement. In one embodiment, the network node configures or requests a wireless terminal receiving first signals on a first carrier having a first carrier frequency and first bandwidth that overlaps with said second bandwidth to perform an estimation or measurement by of second signals transmitted on a second carrier having a second carrier frequency different from said first carrier frequency and second bandwith that overlaps with the first bandwidth. The network node further receives, from said wireless terminal, the estimation or measurement performed by said wireless terminal on the portion of the second bandwidth that overlaps with the first bandwidth.

In some embodiments, configuring or requesting the wireless terminal to perform the estimation or measurement comprises sending assistance data to the wireless terminal.

In some embodiments, sending the assistance data to the wireless terminal comprises at least one of: 1) sending assistance data based on a capability of the wireless terminal to handle interference in the overlapping portion of the first and second bandwidths; and 2) sending an indication indicative of high interference in the overlapping portion of the first and second bandwidths.

In some embodiments, the assistance data comprises at least one of frequency information related to the second carrier frequency, timing information related to the transmission of the second signals, a frequency accuracy related to the transmission of the second signals, information indicating a measurement bandwidth for performing measurements on the second signals, and a receiver configuration.

In some embodiments, the method further comprises receiving, from said wireless terminal, an indication of its capability of performing inter-frequency measurements on the second carrier frequency within a portion of the second bandwidth that overlaps with the first bandwidth.

Yet another embodiment of the disclosure comprises a network node in a wireless communication network that assists a wireless terminal in performing inter-frequency measurements. The network node comprises a communication interface for communicating with the wireless terminal; and processing circuits connected to said communication interface. The processing circuits are adapted to configure or request a wireless terminal receiving first signals on a first carrier having a first carrier frequency and first bandwidth to perform an inter-frequency measurement on second signals transmitted on a second carrier frequency having a second carrier frequency different from said first carrier frequency and second bandwith that overlaps with the first bandwidth. The processing circuits are further adapted to receive, from said wireless terminal, an estimation or measurement performed by said wireless terminal on a portion of the second bandwidth that overlap with the first bandwidth.

In some embodiments, to configure or request the wireless terminal to perform the estimation or measurement on the second signals, the processing circuits are adapted to send assistance data to the wireless terminal.

In some embodiments, to send the assistance data to the wireless terminal, the processing circuits are adapted to: 1) send assistance data based on a capability of the wireless terminal to handle interference in the overlapping portion of the first and second bandwidths; or 2) send an indication indicative of high interference in the overlapping portion of the first and second bandwidths.

In some embodiments, the assistance data comprises at least one of frequency information related to the second carrier frequency, timing information related to the transmission of the second signals, a frequency accuracy related to the transmission of the second signals, information indicating a measurement bandwidth for performing measurements on the second signals, and a receiver configuration. In some embodiments, the processing circuits are further adapted to receive, from said wireless terminal, an indication of its capability of performing inter-frequency measurements on the second carrier frequency within a portion of the second bandwidth that overlaps with the first bandwidth.

Embodiments of the disclosure enable a wireless terminal to perform inter-frequency measurements when the bandwidth of a second signal transmitted on a second carrier frequency overlaps at least in part with the bandwidth of a first signal transmitted on a first carrier frequency. The inter-frequency measurements may be performed with the same samples obtained for the first signals. The inter-frequency measurements may be used to cancel interference, and to enable better coordination between network nodes operating on different frequencies

DETAILED DESCRIPTION

Figure 1:
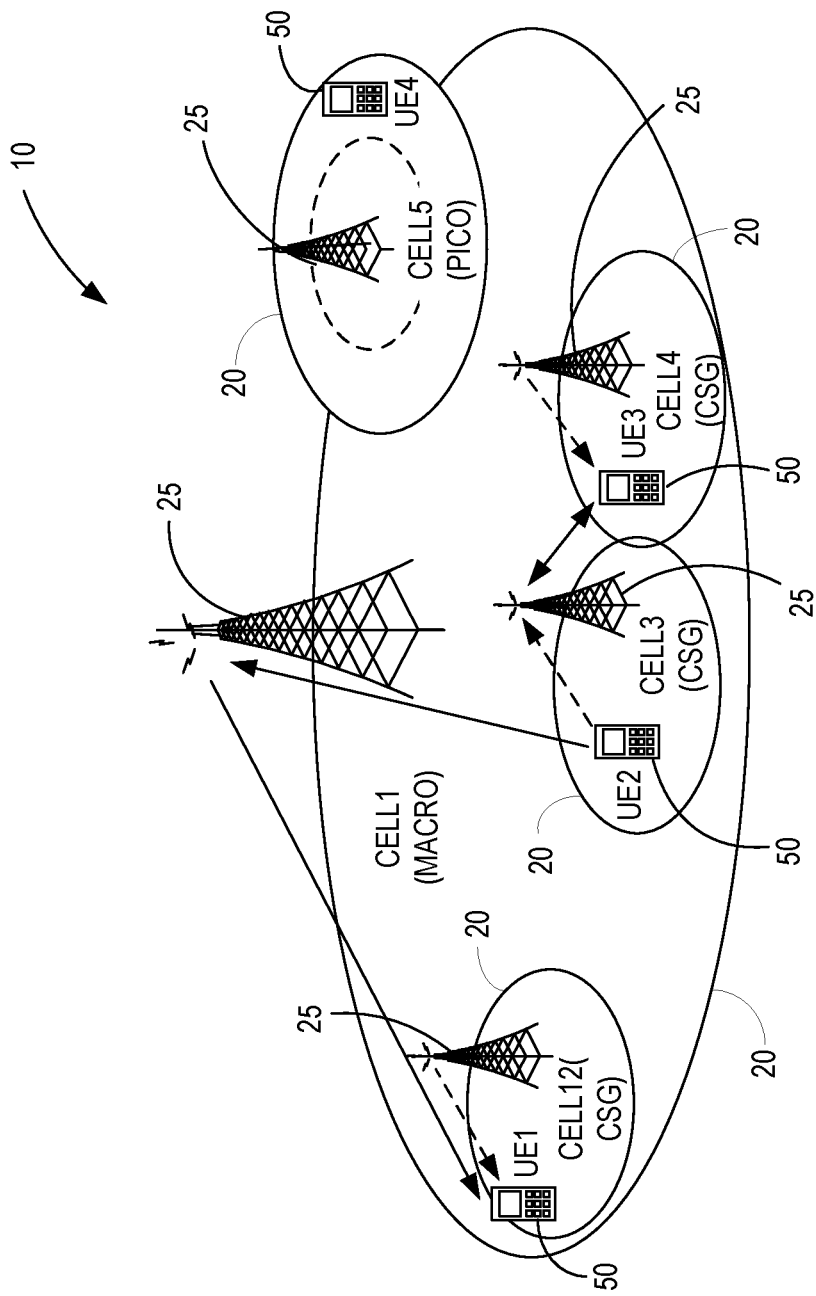
FIG. 1 illustrates a heterogeneous network deployment.

Turning now to the drawings, FIG. 1 illustrates an exemplary heterogeneous communication network 10 according to one exemplary embodiment of the present disclosure. The present disclosure is described in the context of a Long-Term Evolution (LTE) network, which is specified in Release 10 of the LTE standard or later 3GGP releases. However, those skilled in the art will appreciate that the disclosure may be applied in heterogeneous networks using other communication standards. For convenience, similar elements throughout the Figures are indicated by similar reference numbers.

The communication network 10 comprises five cells 20 denoted as Cell1-Cell5 and five base stations 25. Cell1 comprises a macro cell served by a high power base station 25. Cell2-Cell 4 comprise closed subscriber group (CSG) cells 20 served by low-power base stations 25 (e.g., home base stations). Cell 5 comprises a pico cell, which is also served by a low power base station 25 (e.g. pico base station). Cell5 (the pico cell) partially overlaps with the coverage area of Cell1 (the macro cell). Four wireless terminals 50, referred to in the LTE standard as user equipment (UE), are shown in FIG. 1. The wireless terminal 50 denoted as UE1 is served by the high power base station 25 in Cell1 and the downlink transmissions are subject to interference from the low power base station 25 in Cell2. The wireless terminal 50 denoted as UE2 is served by the high power base station 25 in Cell1 and its uplink transmissions to the high power base station 25 in Cell1 cause interference towards the nearby low power base station 25 in Cell3. The wireless terminal 50 denoted as UE3 is served by the low power base station 25 in Cell3 and is subject to interference from the nearby low power base station 25 in Cell4. The wireless terminal 50 denoted as UE4 is served by the low power base station 25 in Cell5 and is within the extended cell range (CRE) area. The various interfering scenarios illustrated in FIG. 1 demonstrate some of the challenges in achieving efficient network operation and superior user experience in a heterogeneous network deployment.

Figure 2:
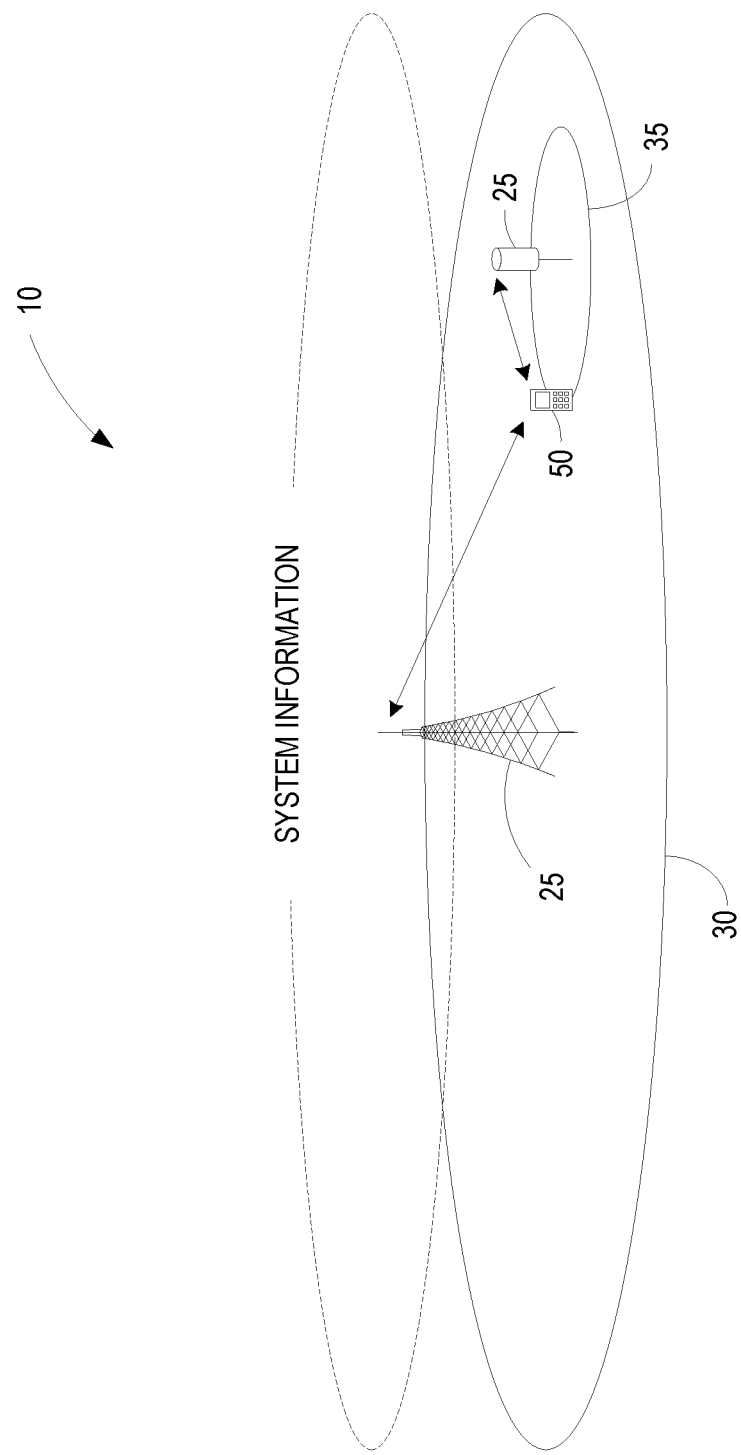
FIG. 2 illustrates a network deployment using dual connectivity.

To further improve communications, dual connectivity may be used in conjunction with heterogeneous networks. An example of a communication network 10 using dual connectivity is shown in FIG. 2. In the example shown in FIG. 2, a wireless terminal 50 has dual connectivity to a high power base station 25 in an anchor cell 30 (anchor node) and a low power base station 25 in a booster cell 35 (booster node). The anchor cell 30 may comprise a macro cell. The booster cell 35 may comprise a pico cell or femto cell.

System information or other important information is provided by the high power base station 25 in the anchor cell 30. The wireless terminal 50 is always connected to one anchor cell 30. The wireless terminal 50 can be connected to one or more booster cells 35. A base station 25 acting as an anchor node for one wireless terminal 50 may act as a booster node for another wireless terminal 50. Anchor and booster connections may be on same or different frequency. Scheduling of resources in the anchor cell 30 and booster cell 35 may be performed separately. The arrangement also allows for separation between the uplink/downlink (UL/DL) connections providing the following advantages:

Path-loss based UL RP selection
Reduced power consumption by the wireless terminal 50.
More balanced interference from the anchor cell towards the booster cell.
Alternative to almost blank subframes (ABSs) for cell range expansion (CRE) area.
Efficient macro cell offloading in uplink (UL).

One common problem related to heterogeneous networks is that it is often difficult for a wireless terminal 50 to perform measurements on signals transmitted from a low-power base station 25 in a heterogeneous network due to interference from neighboring high-power base stations 25. Yet accurate signal estimates and measurements are needed for important functionalities such as cell search, cell identification, mobility management, Radio Link Management (RLM) and Radio Resource Management (RRM), etc.

Physical-layer or radio measurements may be classified by type, purpose, carrier frequency (intra- or inter-frequency), radio access technology (RAT) (intra- or inter-RAT), etc. For example, the measurements may comprise:

Radio Resource Management (RRM) measurements (e.g., cell identification, signal strength, signal quality, wideband Reference Signal Received Quality (RSRQ), wideband Reference Signal Received Power (RSRP));
Radio Link Monitoring (RLM) measurements;
Mobility measurements (e.g., signal strength, signal quality);
Timing measurements (e.g., round trip time (RTT), user equipment (UE) Rx-Tx, Evolved NodeB (eNodeB) Rx-Tx, timing advance, time of arrival (ToA), time difference of arrival (TDOA), reference signal time difference (RSTD), one-way propagation delay, etc.);
Positioning measurements (e.g., measurements for Enhanced Cell ID (E-CID), Adaptive Enhanced Cell ID (AECID), fingerprinting, pattern matching, observed time difference of arrival (OTDOA), hybrid or other positioning method);
Minimization of Drive Tests (MDT) and the like measurements;
Channel state estimation measurements (e.g., channel state information (CSI), Channel quality indication (CQI), rank indication (RI), precoder matrix indication (PMI), etc.);
Direction measurements (e.g., angle of arrival (AoA));

Measurements may also be classified by link type or cell type. For example, the measurements may comprise carrier aggregation (CA) measurements, coordinated multipoint (COMP) measurements, etc.

In heterogeneous networks, measurements must be performed both intra-frequency and inter-frequency. The inter-frequency measurements may involve different radio access technologies (RATs) and/or different operating bands. To define whether intra-frequency, inter-frequency, or inter-RAT requirements apply, the serving cell frequency and RAT are compared to other cells (e.g. target cells) for which measurements are performed. An inter-band measurement may be viewed as a special type of inter-frequency measurement where the inter-frequency belongs to another frequency band. Typically, a band is defined for a specific technology, so inter-RAT may also be inter-frequency, though not any inter-frequency is inter-RAT. However, some bands may be specified for use by different technologies or may even be used by two or more RATs at a time.

In the Third Generation Partnership Project (3GPP) specification TS 36.101 for LTE, a carrier frequency in the uplink and downlink is designated by the E-UTRA (Evolved Universal Terrestrial Radio Access) Absolute Radio Frequency Channel Number (EARFCN) in the range 0-65535. The relation between EARFCN and the carrier frequency in MHz for the downlink is given by:

$$F_{DL} = F_{DL\_low} + 0.1(N_{DL} - N_{Offs-DL})$$

where $F_{DL\_low}$ and $N_{Offs-DL}$ are given in Table 1 below, and $N_{DL}$ is the downlink EARFCN: The relation between EARFCN and the carrier frequency in MHz for the uplink is given by the following equation:

$$F_{UL} = F_{UL\_low} + 0.1(N_{UL} - N_{Offs-UL})$$

where $F_{UL\_low}$ and $N_{Offs-UL}$ are given in Table 1, and $N_{UL}$ is the uplink EARFCN.

TABLE 1

E-UTRA channel numbers [TS 36.101]

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |

TABLE 1-continued

E-UTRA channel numbers [TS 36.101]

| E-UTRA Operating Band | Downlink | | | Uplink | | |
|---|---|---|---|---|---|---|
| | $F_{DL\_low}$ (MHz) | $N_{Offs\text{-}DL}$ | Range of $N_{DL}$ | $F_{UL\_low}$ (MHz) | $N_{Offs\text{-}UL}$ | Range of $N_{UL}$ |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| 27 | 852 | 9040 | 9040-9209 | 807 | 27040 | 27040-27209 |
| 28[2] | 758 | 9210 | 9210-9659 | 703 | 27210 | 27210-27659 |
| 29[2] | 717 | 9660 | 9660-9769 | | N/A | |
| ... | | | | | | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |
| 44 | 703 | 45590 | 45590-46589 | 703 | 45590 | 45590-46589 |

NOTE 1:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.
NOTE
[2]Restricted to E-UTRA operation when carrier aggregation is configured.

In heterogeneous networks, carriers in different cells may also use carriers of different bandwidth. Different bandwidth definitions exist in LTE (see e.g., TS 36.101) and other systems. The term bandwidth may denote any of the following:

System bandwidth.

Channel bandwidth—The radio frequency (RF) bandwidth supporting a single E-UTRA radio frequency (RF) carrier with the transmission bandwidth configured in the uplink or downlink of a cell. The channel bandwidth is measured in MHz and is used as a reference for transmitter and receiver RF requirements.

Transmission bandwidth—The bandwidth of an instantaneous transmission from a wireless terminal 50 or base station (BS), measured in Resource Blocks (RBs).

Transmission bandwidth configuration—The highest transmission bandwidth allowed for uplink or downlink in a given channel bandwidth, measured in RBs.

Aggregated channel bandwidth—The RF bandwidth in which a base station 25 or wireless terminal 50 transmits and receives multiple contiguously aggregated carriers. The aggregated channel bandwidth is measured in MHz.

Sub-block bandwidth—The bandwidth of one sub-block, where the sub-block is one contiguous allocated block of spectrum for transmission and reception by the same base station 25 or wireless terminal 50. There may be multiple instances of sub-blocks within an RF bandwidth.

Measurement bandwidth—The bandwidth over which a measurement is performed. The measurement bandwidth of a signal cannot exceed its transmission bandwidth.

In heterogeneous networks, different cells may also use different RATs. Some examples of different RATs are Long Term Evolution (LTE) and Wideband Code Division Multiple Access (WCDMA), LTE Frequency Division Duplex (FDD) and LTE Time Division Duplex (TDD), or Global System for Mobile Communications (GSM) with General Packet Radio Service (GPRS) and Enhanced Data Rates for Global Evolution (EDGE).

To understand some of the difficulties in making intra-frequency and inter-frequency measurements in heterogeneous networks, the following discussion focuses on measurements for mobility management. Similar principles apply to other types of measurements.

Intra-frequency and inter-frequency measurements for mobility are described e.g. in the 3GGP specification TS 36.300. Measurements to be performed by a wireless terminal 50 for intra/inter-frequency mobility may be controlled by the Evolved Universal Terrestrial Radio Access Network (E-UTRAN), using broadcast or dedicated control channels. In RRC_IDLE state, a wireless terminal 50 follows the measurement parameters defined for cell reselection specified by the E-UTRAN broadcast. The use of dedicated measurement control for RRC_IDLE state is also possible, e.g., through the provision of device-specific priorities. In RRC_CONNECTED state, a wireless terminal 50 follows the measurement configurations specified by RRC directed from the E-UTRAN (e.g, as in UTRAN MEASUREMENT_CONTROL).

Intra-frequency neighbor cell measurements comprise neighbor cell measurements performed by the wireless terminal 50 when the current and target cell operates on the same carrier frequency. The wireless terminal 50 shall be able to carry out such measurements without measurement gaps. Inter-frequency neighbor cell measurements comprise neighbor cell measurements performed by the wireless terminal 50 when the neighbor cell operates on a different carrier frequency, compared to the current cell. The wireless terminal 50 should not be assumed to be able to carry out such measurements without measurement gaps.

Whether a measurement is non-gap assisted or gap assisted depends on the capability of the wireless terminal 50 and the current operating frequency. The wireless terminal 50 determines whether a particular cell measurement needs to be performed in a transmission/reception gap and the scheduler needs to know whether gaps are needed. Examples of intra-frequency scenarios are Scenarios A, B, and C in FIG. 3:

Scenario A: Same carrier frequency and cell bandwidth for current serving cell and target cell;
Scenario B: Same carrier frequency, and bandwidth of the target cell is smaller than the bandwidth of the current serving cell;
Scenario C: Same carrier frequency, and bandwidth of the target cell is larger than the bandwidth of the current cell.

Figure 3:
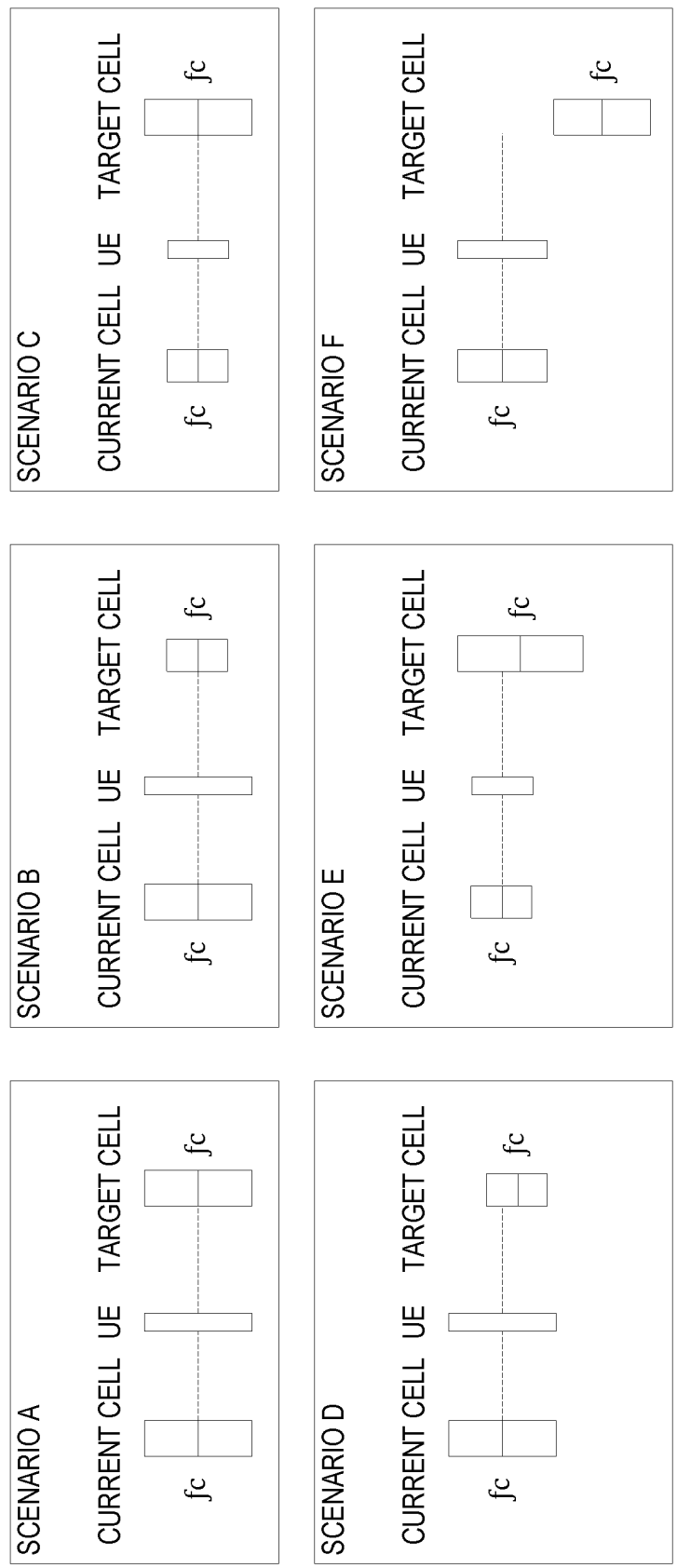
FIG. 3 illustrates inter-frequency and intra-frequency measurement scenarios.

Examples of inter-frequency scenarios are Scenarios D, E, and F in FIG. 3:

Scenario D: Different carrier frequencies, and bandwidth of the target cell is smaller than and within the bandwidth of the current serving cell.
Scenario E: Different carrier frequencies, and bandwidth of the target cell is larger than and includes the bandwidth of the current serving cell.
Scenario F: Different carrier frequencies and non-overlapping bandwidth.

The disclosure focuses on Scenario D, Scenario E, or any inter-frequency scenario where the target bandwidth overlaps with the serving bandwidth, at least in part. The inter-frequency Scenario F is beyond the scope of the disclosure since there is no overlap between the interfering bandwidth and measured bandwidth.

Measurement gap patterns are configured and activated by Radio Resource Control (RRC). In Long Term Evolution (LTE), measurement gaps are as specified in TS 36.133. The Evolved Universal Terrestrial Radio Access (E-UTRA) UE supports two configurations comprising of the maximum gap repetition period (MGRP) of 40 and 80 ms; both with the measurement gap length of 6 ms. In practice due to the frequency switching time less than 6 sub-frames but at least 5 full sub-frames are available for measurements within each such measurement gap. Unlike in Universal Terrestrial Radio Access (UTRA), one measurement gap pattern is used in LTE for all measured inter-frequencies and RATs. In UTRAN Frequency Division Duplex (FDD), the measurements on other UTRA FDD carriers and on other RATs (e.g. LTE, GSM, etc.) are carried out in compressed mode (CM) gaps, which occur periodically. For example a CM gap pattern may comprise of 10 UTRA FDD slots (1 slot=0.67 ms) gap occurring every 2nd frame (1 frame=10 ms). One main difference between UTRAN FDD and LTE is that in the former, one CM pattern is used for each carrier, e.g., 2 CM patterns for measuring on two different UTRA FDD carriers.

When Carrier Aggregation (CA) is configured, the "current cell" above refers to any serving cell of the configured set of serving cells, i.e., Primary Cell (PCell) or Secondary Cell (SCell). For instance, for the definition of intra- and inter-frequency measurements, this means:

Intra-frequency neighbor cell measurements: Neighbor cell measurements performed by the wireless terminal 50 are intra-frequency measurements when one of the serving cells of the configured set (comprising activated and/or not activated serving cells) and the target cell operates on the same carrier frequency. The wireless terminal 50 shall be able to carry out such measurements without measurement gaps.

Inter-frequency neighbor cell measurements: Neighbor cell measurements performed by the wireless terminal 50 are inter-frequency measurements when the neighbor cell operates on a different carrier frequency than any serving cell of the configured set. The wireless terminal 50 should not be assumed to be able to carry out such measurements without measurement gaps.

In a system with a sufficient number of cells on an intra-frequency, mobility within the same frequency layer (i.e., between cells with the same carrier frequency) is predominant. Good neighbor cell measurements are needed for cells that have the same carrier frequency as the serving cell in order to ensure good mobility support and easy network deployment. However, the number of good cells on a frequency may be not sufficient, or the quality of cells may be better than on another frequency. There may also be preferred cells of a certain type, e.g., for fast moving wireless terminals 50 large cells may be more preferred.

In general, in LTE, inter-RAT measurements are typically defined similar to inter-frequency measurements, e.g., they may also require configuring measurement gaps. Inter-RAT measurements may have more measurements restrictions and more relaxed measurement requirements.

In the past, it was often assumed that inter-frequency radio signals would not cause interference to intra-frequency signals. That is, it was assumed that the channel bandwidths for signals on carrier frequency F1 and carrier frequency F2 did not overlap. However, inter-frequency measurements are still needed for some purposes, e.g., mobility management.

Heterogeneous deployments increase the difficulty in making inter-frequency measurements. One challenge is that an interfering signal on carrier frequency F2 may be not transmitted on the same subcarrier spacing grid as the victim signal on carrier frequency F1. Also, the bandwidth of the interfering signal on carrier frequency F2 may be not fully comprised in the bandwidth (e.g., measurement bandwidth or transmission bandwidth) of the victim signal on carrier frequency F1.

As noted above, measurement gaps are often used for inter-frequency measurements, which normally prevent simultaneous reception of signals on different frequencies when one of them is on the serving carrier or even in the serving cell. However, in case of overlapping frequencies in heterogeneous network scenarios, inter-frequency measurement gaps may not reduce the risk that synchronization signals in low power victim cells (e.g., pico cells) are interfered by higher power aggressor cells (e.g., macro cells). Thus, prior art measurement gaps do not solve problems with inter-frequency measurements caused in by heterogeneous deployment scenarios.

When the interference from a signal on carrier frequency F2 with channel bandwidth overlapping with the channel bandwidth on carrier frequency F1 is high, the interference needs to be coordinated or handled at the receiver to ensure good performance. The latter, however, is challenging under the current standard.

Exemplary embodiments of the disclosure provide techniques for use in scenarios where radio transmissions on a first carrier frequency having a first carrier frequency F1 and first bandwidth BW1 are interfered by radio transmission on a second carrier having a second carrier frequency F2 and second bandwidth BW2. The scenarios of interest are those where the bandwidths of the first and second carriers overlap at least in part. Some examples of such scenarios are Scenario D and Scenario E in FIG. 3. The term "inter-frequency" herein may also comprise any one or a combination of inter-frequency, inter-band, and/or inter-RAT. A transmission herein may refer to a downlink transmission. Some examples of downlink transmissions include the transmission of a physical signal (e.g., reference signal or synchronization signal), physical channel (e.g., Physical Broadcast Channel (PBCH), Physical Downlink control Channel (PDCCH), Enhanced Physical Downlink control Channel (EPDCCH), or Physical Downlink Shared Channel (PDSCH)), or logical channel transmissions. The term "bandwidth" herein may refer to any bandwidth describing an interfering (aka aggressor) signal/channel and/or interfered (aka "victim") signal/channel.

Some example embodiments comprise methods implemented by a network node for controlling or adjusting the transmission configuration in a specific way adaptively to the scenario. Other example embodiments comprise methods implemented by a wireless terminal 50 of performing measurements accounting the bandwidths overlap.

Figure 4:
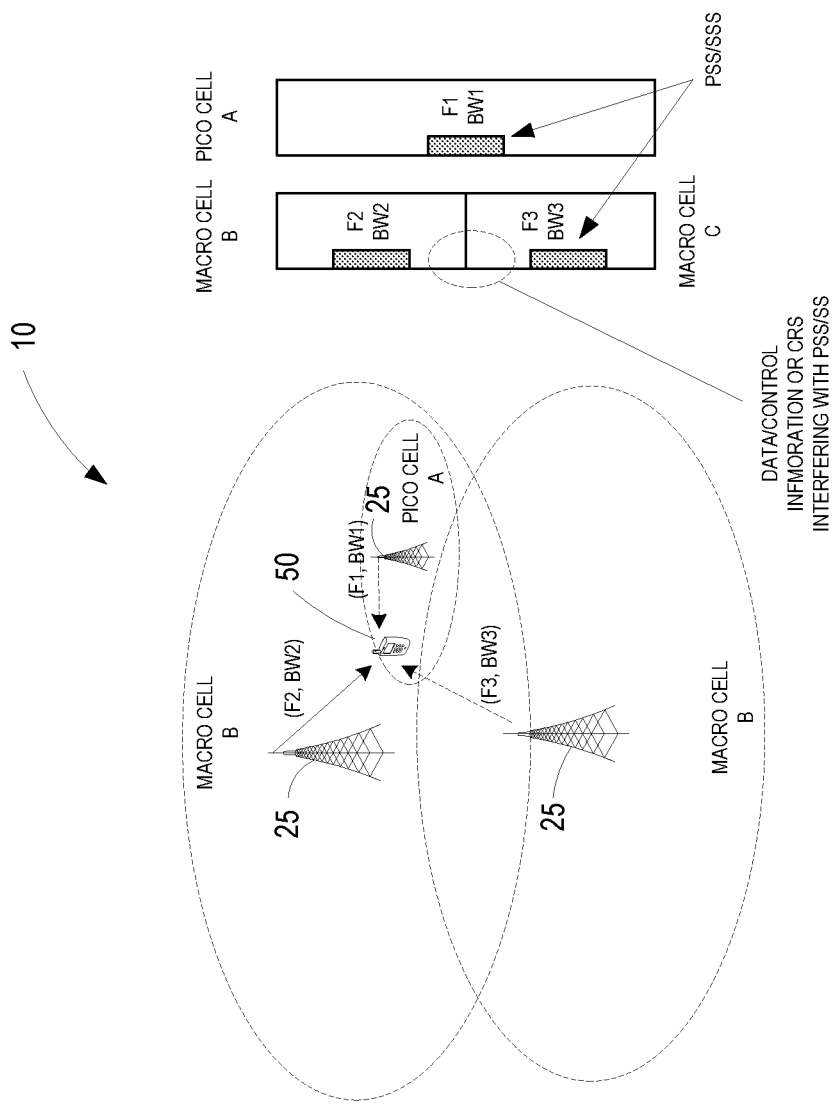
FIG. 4 illustrates an exemplary interference scenario.

FIG. 4 shows a relevant, non-limiting example scenario for some embodiments of the disclosure. FIG. 4 illustrates a heterogeneous network deployment 10 comprising a pico cell (Cell A) served by a low power base station 25, and two macro cells (Cells B and C) served by high power base stations 25. The low power base station 25 in cell A transmits on a first carrier frequency F1 with 10 MHz bandwidth (BW1). The other two base stations 25 transmit on carrier frequencies carrier frequency F2 and F3 respectively, each with 5 MHz bandwidths (BW2 and BW3). This configuration may be used for example, to exploit the benefits (low interference) provided by frequency reuse greater than 1 between cells B and C. In this example scenario, the bandwidths BW2 and BW3 of Cells B and C overlap at least in part with the bandwidth BW1 of Cell A. The carrier frequencies F1, carrier frequency F2, and F3 for all three cells are different.

Since carrier frequencies carrier frequency F2 and F1 are different and have overlapping bandwidths, a wireless terminal 50 (e.g., wireless phone, smart phone, laptop, modem, smartphone, tablet, sensor, machine type communication (MTC) devices etc.) camping on or served by cell B (carrier frequency F2) may have a problem detecting the Primary Synchronization Signal (PSS) and Secondary Synchronization Signal (SSS) on carrier frequency F1 transmitted by the Cell A due to inter-frequency interference at least from carrier frequency F2 (e.g., when the wireless terminal 50 is in the CRE zone and the DL signal from Cell B is stronger than DL signal from Cell A. Since the PSS/SSS of the pico cell (Cell A) does not collide with PSS/SSS of the macro cell (Cell B), but instead with data or control or other signals like (CRS, BCH etc.) signals, the standard prior art PSS/SSS interference cancelling (IC) of the macro cell PSS/SSS does not work. Hence new approaches are needed.

In one exemplary embodiment, inter-frequency interference coordination techniques are used to reduce interference between two signals with overlapping bandwidth. More particularly, the transmission configuration of second radio signals on a second carrier frequency F2 associated with bandwidth BW2 causing interference with first radio signals on a first carrier frequency F1 associated with bandwidth BW1 (F1 is different from carrier frequency F2, and bandwidth BW2 is overlapping with bandwidth BW1 at least in part but bandwidth BW2 may also be fully comprised in bandwidth BW1) is controlled or adapted in a radio network node to reduce such interference within the overlapping part of two bandwidths associated with two different frequencies. The control may be static, semi-static, or dynamic. In one example, bandwidths BW1 and BW2 may comprise any of a channel bandwidth, system bandwidth, a cell bandwidth, or a transmission bandwidth. In another example, bandwidth BW1 may comprise a measurement bandwidth (e.g., of a victim signal to be measured on carrier frequency F1). The network node may be a radio network node (e.g., serving eNodeB, another BS, Radio Network Controller (RNC), or a gateway) or a core network node (e.g., mobility management entity (MME), positioning node, SON, coordinating node, etc.).

The first and/or the second radio signals may have certain characteristics. Some examples of signals with certain characteristics include synchronization signals such as the PSS and SSS, common reference signals such as a cell-specific reference signal (CRS) or a Multicast/Broadcast Single Frequency Network Reference Signal (MBSFN RS), a dedicated reference signal such as a demodulation reference signal (DM-RS) associated with PDSCH or EPDCCH, a channel state information reference signal (CSI-RS), broadcast or multicast signals such as the Master Information Block (MIB) or System Information Block 1(SIB1), a shared channel such as the PDSCH, a control channel such as the PDCCH or EPDCCH, etc.

In one exemplary embodiment, a network node (e.g. a base station 25 or control node) determines the need for reducing interference between two overlapping carriers with different bandwidths. In response to the determining, the network node may 1) signal the need to reduce interference to another network node, or request another node to reduce the interference; 2) control the transmission configuration of another network node to reduce the interference; or 3) adjust a transmission configuration of the network node to reduce the interference.

As an example, assume that second radio signals transmitted on carrier frequency F2 with bandwidth BW2 causes interference with first radio signals transmitted on carrier frequency F1 with bandwidth BW1, and that bandwidths BW1 and BW2 overlap at least in part. The network node may perform the following steps:

Step 1: Determine the need for reducing interference within the overlap of a bandwidth BW2 on carrier frequency F2 and bandwidth BW1 on carrier frequency F1 caused by second signals transmitted on carrier frequency F2. The determining step may further comprise determining the interfering signals transmitted on carrier frequency F1 within bandwidth BW1, and/or determining interfering time-frequency resources on carrier frequency F1 within the overlap BW2∩BW1. In some embodiments, the interference from carrier frequency F2 is determined to be high, e.g., based on distance estimation, location information, radio measurements on carrier frequency F2, interference measurements or signals quality measurements on carrier frequency F1, which may be compared to a reference or a threshold, etc.

Step 2: (Optional) Communicate to an inter-frequency interference function a request or an indication for the need to reduce inter-frequency interference or one or more of the results from the determining step, e.g.,
Via cross-layer, or Signaling to a radio network node comprising the inter-frequency interference function (e.g., when the radio network node transmitting radio signals on carrier frequency F1 is not the same node as the controlling node).

Step 3: Reduce the interference from one or more of the interfering signals transmitted on carrier frequency F2 by controlling or adjusting the transmission configuration, adaptively to the result of the determining step, i.e. Step 1 above. The transmission configuration can be adjusted by one or more of:

Reducing the transmit power of the interfering signal,

Muting of the interfering signal (with or without turning of the transmitter),

Adaptively (re)scheduling of the interfering signal.

Figure 5:
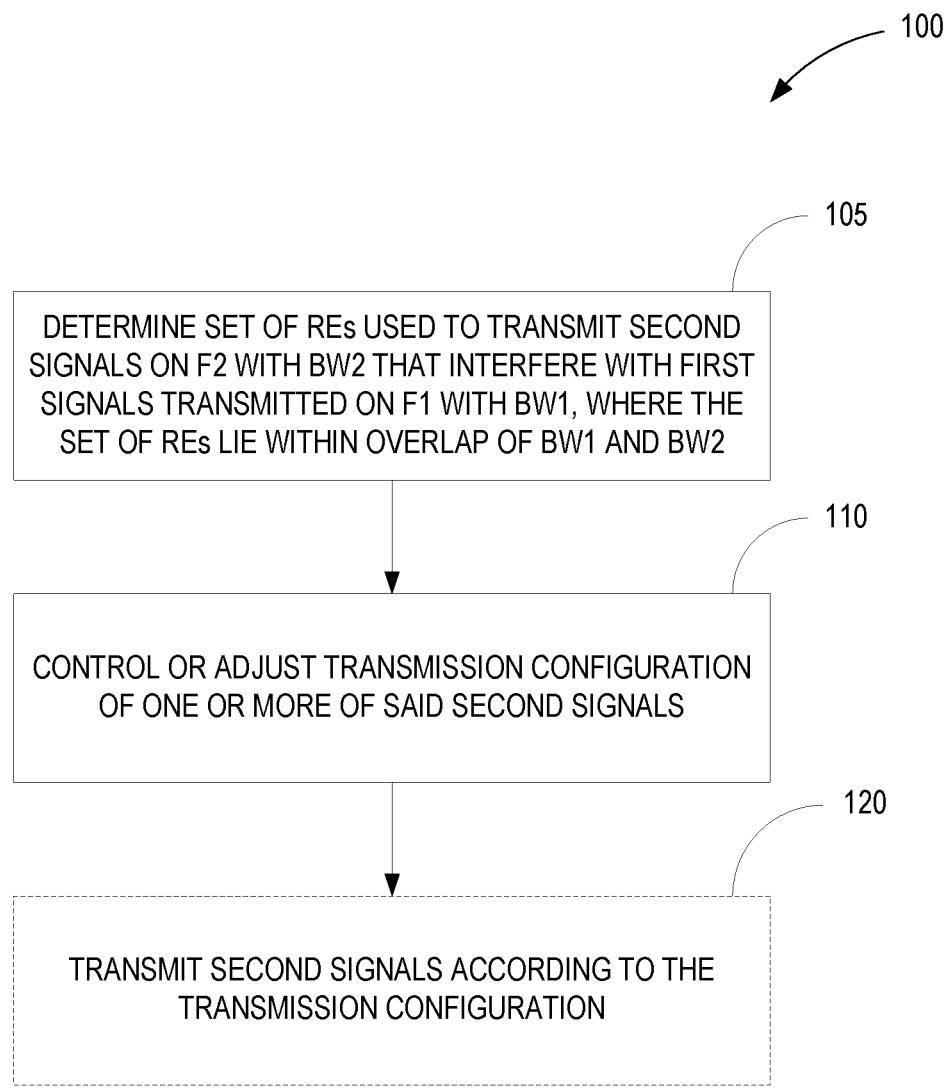
FIG. 5 illustrates a method of interference coordination implemented by a network node.

FIG. 5 is a flow chart illustrating an exemplary method 100 implemented by a network node according to one embodiment. The network node may comprise a base station 25, control node, or other network node. A network node determines a set of resource elements (REs) used to transmit second signals on a second carrier frequency F2 with a bandwidth BW2 (e.g., system bandwidth or transmission bandwidth) that interfere with first signals transmitted on a first carrier frequency F1 with bandwidth BW1 (block 105). In LTE, a RE comprises one subcarrier on one OFDM symbol. The second carrier frequency F2 is different from the first carrier frequency F1 and the second bandwith BW2 overlaps, at least in part, the first bandwidth BW1 (e.g., transmission bandwidth or channel bandwidth). The network node controls or adapts the transmission configuration of one or more of the second signals (block 110) and transmits the second signals on carrier frequency F2 (block 115).

Different ways for determination of the interfering resource elements (REs), interfering signals, or interference levels may be envisioned. For example, the REs in the overlapping part of bandwidths BW1 and BW2 may be determined 1) based on backhaul signaling of assistance data between the network nodes (FIG. 6A); 2) based on signaling of assistance data by a wireless terminal 50 (FIG. 6B); 3) based on measurement of signals transmitted by the network nodes (FIG. 6C); or 4) based on cross-layer communication when the network nodes are co-located.

Figure 6A:
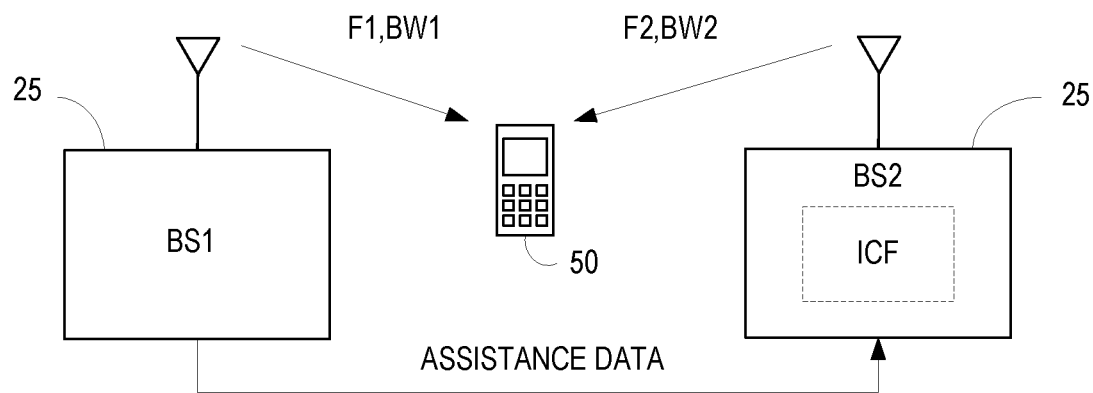
FIGS. 6A-6D illustrate various interference coordination scenarios.

FIG. 6A illustrates an example of backhaul signal between a first base station 25 denoted as BS1 and a second base station 25 denoted as BS2. BS1 transmits on carrier frequency F1 with bandwidth BW1. BS2 transmits on carrier frequency F2 with bandwidth BW2 that overlaps with bandwidth BW1. BS2 includes an interference coordination function (ICF). In this scenario, BS1 may signal to BS2 its carrier frequency and bandwidth, radio signal transmission configuration, timing information related to transmissions on carrier frequency F1, and/or interference-related information, (e.g., measurements, interference indication, load indication, etc.). Based on the assistance data, the ICF at BS2 determines the REs in the overlapping portion of bandwidths BW1 and BW2 and controls the transmission configuration on carrier frequency F2 to reduce interference.

Figure 6B:
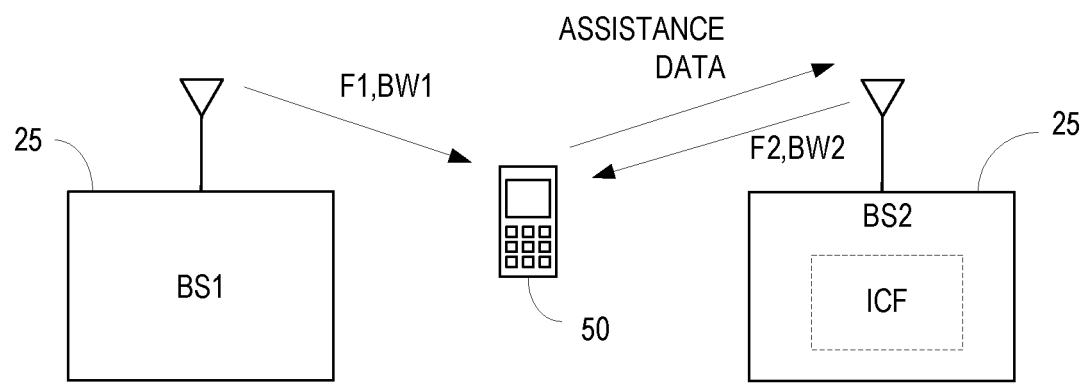

FIG. 6B illustrates an example where a wireless terminal 50 provides assistance data to BS2 for determining the REs in the overlapping portion of bandwidths BW1 and BW2. In this example, BS1 transmits on carrier frequency F1 with bandwidth BW1. BS2 transmits on carrier frequency F2 with bandwidth BW2 that overlaps with bandwidth BW1. BS2 includes an interference coordination function (ICF). In this scenario, the wireless terminal 50 transmits assistance data to BS2 to enable BS2 to determine the REs in the overlapping portion of bandwidths BW1 and BW2. The assistance data may, for example, comprise the carrier frequency and bandwidth of BS1, the radio signal transmission configuration of BS1, timing information related to transmissions on carrier frequency F1, and/or interference-related information, (e.g., measurements, interference indication, load indication, etc.). This information may be determined based on signaling from another node or based on measurements by the wireless terminal 50. Based on the assistance data, the ICF at BS2 determines the REs in the overlapping portion of bandwidths BW1 and BW2 and controls the transmission configuration on carrier frequency F2 to reduce interference.

Figure 6C:
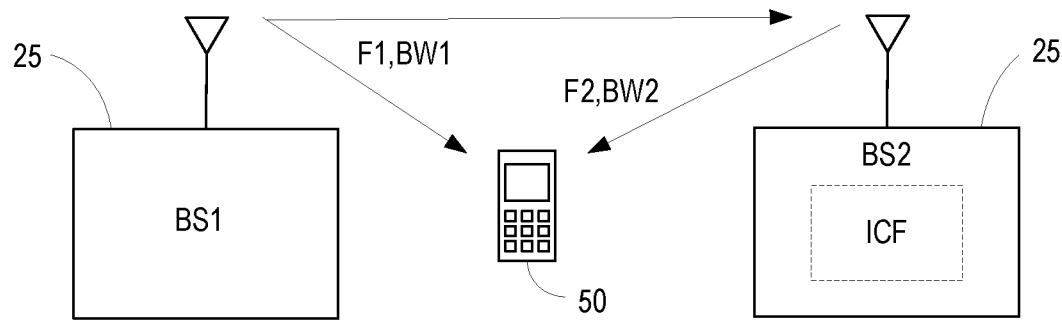

FIG. 6C illustrates an example where BS2 receives transmissions from BS1 and uses the received signals to determine the REs in the overlapping portion of the bandwidths BW1 and BW2. In this example, BS1 transmits on carrier frequency F1 with bandwidth BW1. BS2 transmits on carrier frequency F2 with bandwidth BW2 that overlaps with bandwidth BW1. BS2 includes an interference coordination function (ICF). In this scenario, the BS2 receives signals transmitted by BS1 and may perform measurements on the received signals. BS2 may detect synchronization signals, reference signals, or other signals transmitted by BS1 in the overlapping portion of bandwidths BW1 and BW2. Based on the received signals, BS2 determines the REs in the overlapping portion of bandwidths BW1 and BW2 and controls the transmission configuration on carrier frequency F2 to reduce interference.

Figure 6D:
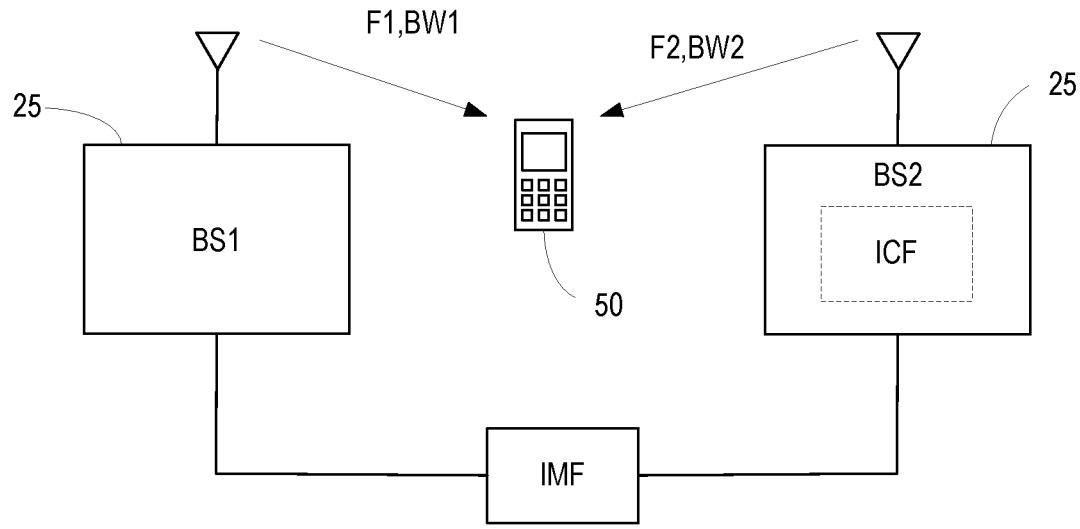

FIG. 6D illustrates and example where the ICF is located apart from the network nodes transmitting on carrier frequencies F1 and carrier frequency F2 respectively. In this example, BS1 transmits on carrier frequency F1 with bandwidth BW1. BS2 transmits on carrier frequency F2 with bandwidth BW2 that overlaps with bandwidth BW1. The ICF is separate from both BS1 and BS2. The ICF receives information to enable it to determine the REs in the overlapping portion of bandwidths BW1 and BW2. Such information may, for example comprise the carrier frequency and bandwidth of BS1 and BS2, the radio signal transmission configuration of BS1 and BS2, timing information related to transmissions on carrier frequencies F1 and carrier frequency F2 respectively, and/or interference-related information, (e.g., measurements, interference indication, load indication, etc.). Based on the received signals, the ICF determines the REs in the overlapping portion of bandwidths BW1 and BW2 and controls the transmission configuration on carrier frequency F2 to reduce interference.

Those skilled in the art will appreciate that the determination of the overlapping REs could also be made by the network node transmitting on carrier frequency F1 and signaled to the network node transmitting on carrier frequency F2. In this case, an ICF at the network node transmitting on carrier frequency F2 can adjust the transmission configuration to reduce the interference with the radio signals transmitted on carrier frequency F1. The network node transmitting on carrier frequency F1 may receive assistance data from the network node transmitting on carrier frequency F2, from a wireless terminal 50, or other network node. Also, the network node transmitting on carrier frequency F1 may receive transmissions on carrier frequency F2 in the overlapping portion of the bandwidths BW1 and BW2 and perform measurements on the received signals.

The network node controls or adapts the transmission configuration of the signals transmitted on carrier frequency F2 in all or a subset of the determined REs in a static, semi-static (e.g., medium-time scale adjustments in the order or days or hours), or dynamic way. In one embodiment, the transmission power on carrier frequency F2 may be reduced relative to a reference level used for transmission of another RE outside the determined set of RE. Alternatively, the transmit power on carrier frequency F2 for a subset of REs is may be reduced to substantially zero, i.e., the REs are nulled or muted. In some embodiments, all determined REs are transmitted with a reduced power.

The power reduction may preferably be done in the digital domain by applying a scale factor, $\beta<1$, to a subset of the determined REs. In other embodiments, analog adjustment may be possible. The entire signal then further processed and transmitted according to known methods.

In some embodiments, signals transmitted on carrier frequency F2 over a shared data channel are adaptively rescheduled to avoid interference with signals transmitted on carrier frequency F1. For example, signals transmitted on carrier frequency F2 in the determined set of REs may be adaptively rescheduled to a set of REs on carrier frequency F2 that are outside the overlapping portion of the bandwidths BW1 and BW2. The (re)scheduling may be static, semi-static, or dynamic in time. It may also be selective (e.g., per UE, area, antenna beam, etc.).

The control or adaptation may be applied only to REs related to data or control signaling (e.g., PDCCH or PDCCH), or in general "unknown (for most UEs)", while REs including CRS, DM-RS, SSS, PSS signals, or in general "known for all or at least for more than one UE" signals are not.

According to another aspect of the disclosure, interference mitigation techniques may also be employed at the wireless terminal 50 receiving transmissions on carrier frequency F1 with interference from carrier frequency F2. According to this aspect of the disclosure, the wireless terminal 50 may adapt its receiver depending on transmissions control or adjustments performed by the network node in order to mitigate the interference on the overlapping part of the bandwidths BW1 and BW2.

According to another embodiment, the wireless terminal 50 may adapt its receiver depending on whether the network node performs the control of the transmissions to mitigate inter-frequency interference from carrier frequency F2 to carrier frequency F1. For example, the device may adaptively select receiver type or receiver configuration while performing estimates or measurements on carrier frequency F1. Also depending on the device receiver capability, the wireless terminal 50 may even choose to not perform measurements on the part of the overlapping part of the bandwidth where the interference from carrier frequency F2 is present. The wireless terminal 50 receiver adaptation may further depend on one or more of 1) interference level in the overlapping part (e.g., based on device's measurements); 2) received signal strength of the interfering signal transmitting on carrier frequency F2; 3) the size of the overlapping part of bandwidths BW1 and BW2 (e.g., larger overlap may result in a larger impact of the interference from carrier frequency F2 and hence the receiver adaptation may become more important); 4) the type of the interfering signals on carrier frequency F2 and/or interfered signals on carrier frequency F1 (e.g., the interference from known signals is typically easier to mitigate); and/or 5) the availability at the wireless terminal 50 of the configuration information about the interfering signals.

In one embodiment, the wireless terminal 50 may send an indication to a network node indicative of high interference on the overlapping part of the bandwidth. The indication may be a binary indicator, an indication for the need of or a request for using of interference mitigation techniques in the overlapping part of the bandwidths, or measurements indicative of high interference from carrier frequency F2 and/or poor quality of signals on carrier frequency F1.

In another embodiment, the wireless terminal 50 may receive from a network node the transmission configuration (e.g., adapted to mitigate the interference from carrier frequency F2) and use this information to adaptively configure its receiver. The wireless terminal 50 may also send a request to the network node for such configuration information.

In yet another embodiment, the wireless terminal 50 may dynamically adapt its receiver when the network node dynamically controls its transmissions to mitigate the inter-frequency interference from carrier frequency F2.

According to another aspect of the disclosure, the wireless terminal 50 may perform estimation or measurements on carrier frequency F2 in the portion of the bandwidth BW2 that overlaps with the bandwidth BW1 of carrier frequency F1, i.e., BW1∩BW2. Bandwidth BW1 may be fully comprised in bandwidth BW2, or may partially overlap bandwidth BW2. One advantage of this approach is that, when bandwidths BW1 and BW2 overlap, the baseband signal sampled for estimation or measurement on carrier frequency F1 may be used also for an estimation or a measurement on a different carrier frequency F2. Each of the carrier frequencies F1 and carrier frequency F2 may or may not be serving carrier frequencies, although it may be more common that at least one of the frequencies is a non-serving frequency (e.g., there is no serving cell for the wireless terminal 50 on that frequency).

Figure 7:
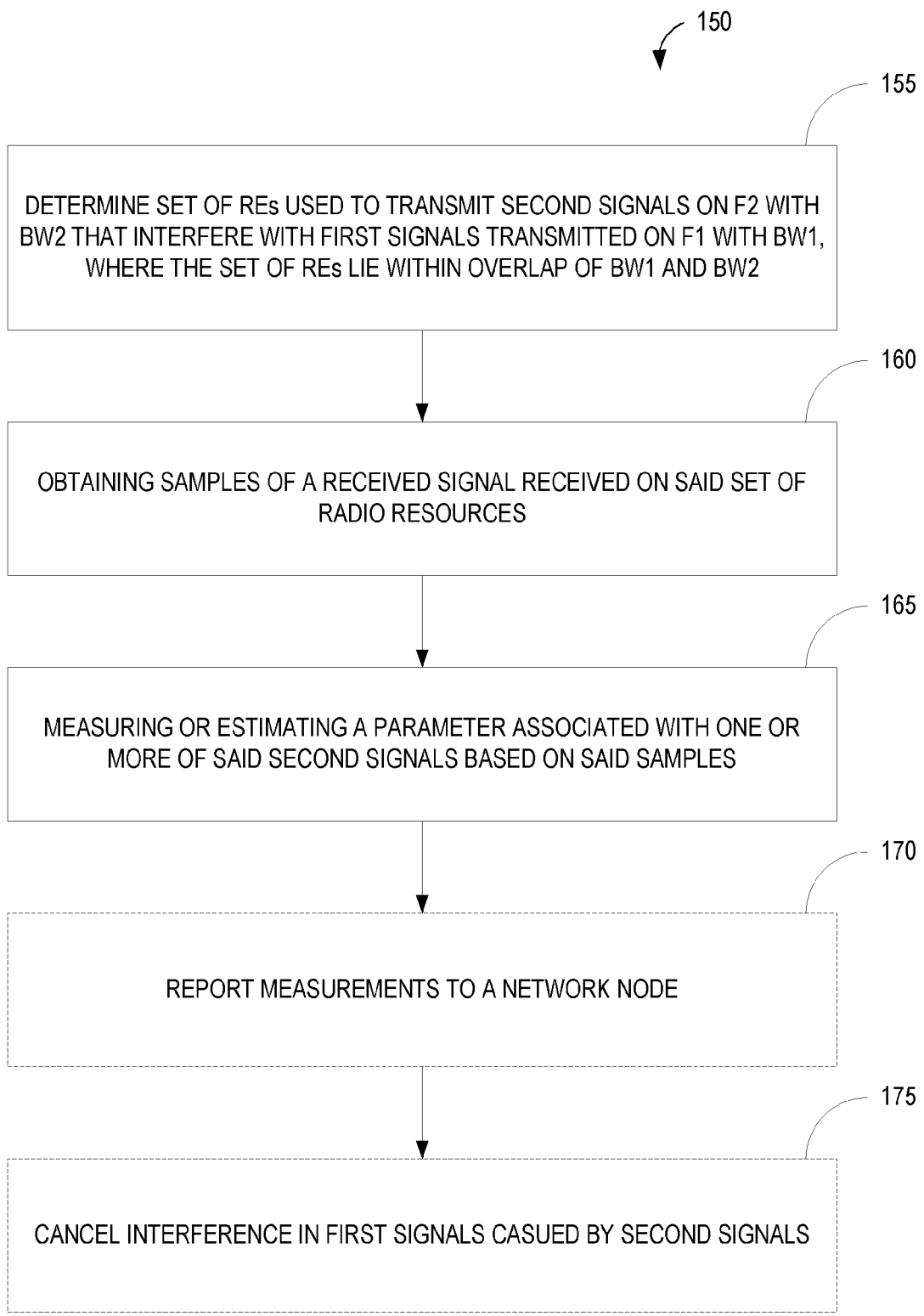
FIG. 7 illustrates a method of inter-frequency measurement implemented by a wireless terminal.

FIG. 7 illustrates an exemplary method 150 performed by a wireless terminal 50. The wireless terminal 50 determines a set of radio resources used for the transmission of second signals on a second carrier having a second carrier frequency and second bandwidth that interfere with first signals transmitted on a first carrier having a first carrier frequency different from the second carrier frequency and first bandwidth (block 155). The radio resources may, for example, comprise a set of REs in an OFDM time-frequency grid. The set of radio resources are within a portion of the second bandwidth that overlaps with the first bandwidth. The set of resources may be determined based on radio transmissions received from one or more network nodes (FIG. 8A), assistance data received from one or more network nodes (FIGS. 8B and 8C), or a combination thereof. The wireless terminal 50 obtains samples of a received signal received on the set of resources within the overlapping bandwidths (block 160). Based on the samples, the wireless terminal 50 measures or estimates a parameter of the second signals (block 165).

Figure 8A:
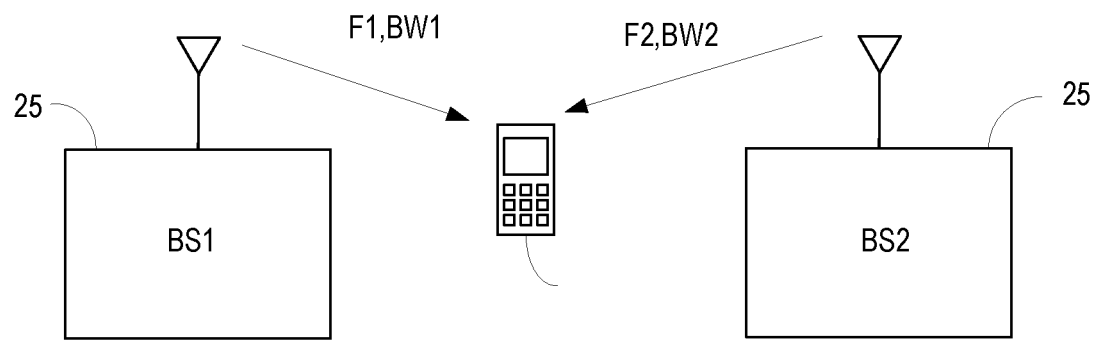
FIGS. 8A-8C illustrate
Figure 8B:
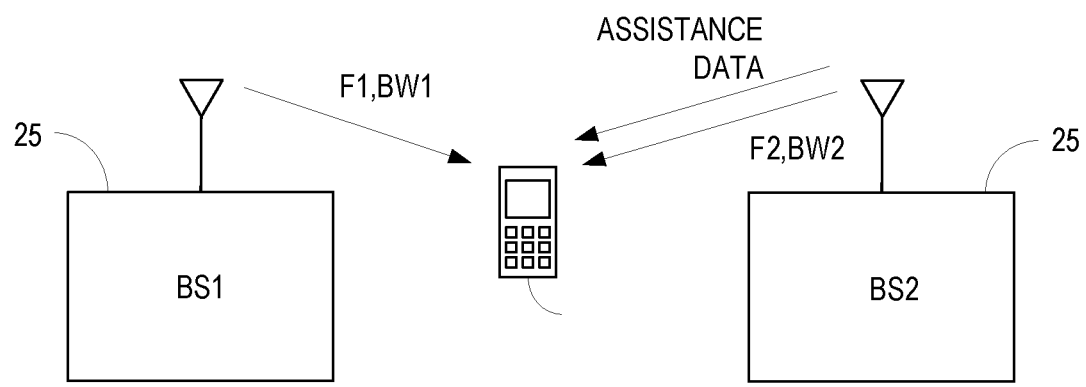
Figure 8C:
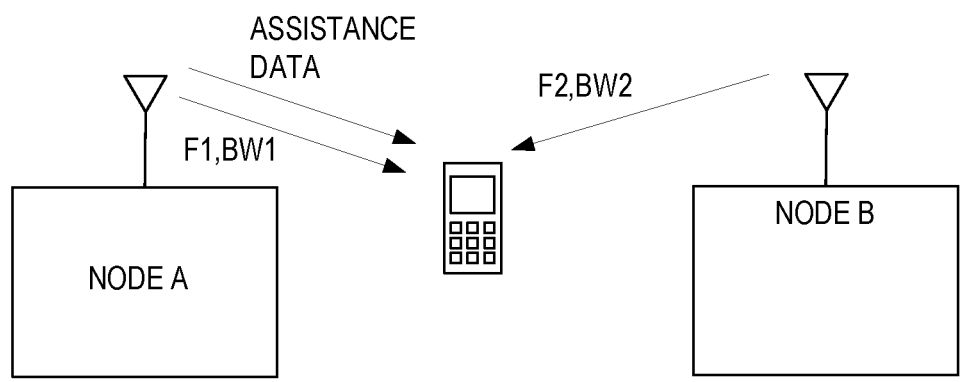

FIG. 8A illustrates a scenario where the wireless terminal 50 receives first signals from a first base station 25 (BS1) on carrier frequency F1 with bandwidth BW1 and second signals from a second base statin 25 (BS2) on carrier frequency F2 with bandwidth BW2. Carrier frequencies F1 and F2 are different and the bandwidth of F2 overlaps, at least in part, with the bandwidth BW1. In this case, the wireless terminal 50 may determine the REs in the overlapping portion of bandwidths BW1 and BW2 based on measurements of the received signals. In FIG. 8B, the wireless terminal 50 also receives assistance data from BS2 that is used in determining the REs in the overlapping portion of the bandwidths BW1 and BW2. In FIG. 8B, the wireless terminal 50 also receives assistance data from BS1 that is used in determining the REs in the overlapping portion of the bandwidths BW1 and BW2.

In some embodiments, the wireless terminal 50 may optionally report the inter-frequency measurements to a network node (e.g. serving base station 25)(block 170). The measurement report may include an indication that the measurement was performed on a portion of the second bandwidth, and may further indicate the measurement bandwidth for the measurements performed on the second signals. This embodiment differs from prior art methods, for example, in that the bandwidth signal measurements (e.g., RSRP/RSRQ for instance) are different to currently defined measurement bandwidths. In some embodiments, the wireless terminal 50 may optionally use the inter-frequency measurements to reduce interference in the first signals received on the first carrier frequency (block 175).

In some embodiments, the wireless terminal 50 may adapt the measurement filters to adapt to current measurement bandwidth. For example, in current LTE standards, the L1 measurement filter (aka measurement time e.g. in TS 36.133) is 200 ms assuming 6 RBs of measurement bandwidth. In case of, say, measurement on only 4 RBs, the filtering time may be increased with 50%, i.e. up to 300 ms. The wireless terminal 50 may also adapt the scaling factors applied to compensate for that different parts on the bandwidth is used for signal measurements (compared to prior art methods). For example, in current LTE releases, only the central 6 RBs are used for measurements. Using another set of RBs, due to scheduling rules may have another load compared to the central RBs, and hence a scaling may be needed for obtain comparative results. This is especially the case for measurements reflecting load, like RSRQ.

In one embodiment, the inter-frequency measurements on carrier frequency F2 may be associated with a specific activity state of the wireless terminal 50 (e.g., a low-activity state such as IDLE or DRX) or battery level. In other embodiments, such measurements may be performed for a specific purpose such as:
- estimating the interference from carrier frequency F2 (which may be used further e.g. for reporting to another node, adapting the receiver to operate in low/medium/high interference conditions; handling the interference in a specific way, e.g., performing interference cancellation or rejection);
- RRM, cell identification, mobility, cell (re)selection, carrier selection;
- MDT;
- SON; and
- Positioning.

Further, in another embodiment, if the subcarriers for transmissions on carrier frequency F1 and subcarriers for transmissions on carrier frequency F2 are not aligned on the same sub-carrier grid, the wireless terminal 50 may perform additional processing. This may be possible since the EARFCN numbers defining the carrier spacing is with 100 kHz spacing, while the LTE sub-carrier spacing is 15 kHz. If this is the case, the wireless terminal 50 may align the received baseband signal with the raster grid in the following way: the baseband signal is stored and a digital mixer mixes the stored baseband signal to a carrier frequency matching the 15 kHz carrier grid.

An example procedure in a wireless terminal 50 may comprises the following steps:
1. storing a digital baseband signal received on carrier frequency F1 in a buffer;
2. (optional) taking the Fast Fourier Transform (FFT) or Discrete Fourier Transform (DFT) of the signal received on carrier frequency F1 to transform the time domain samples to the frequency domain;
3. (optional) performing an estimation or a measurement (e.g. RSRP or RSEQ) on carrier frequency F1;
4. replaying the stored signal from the buffer;
5. (optional) if not on the same subcarrier grid, digitally mixing signal to frequency align the baseband signal with the sub-carrier grid;
6. taking the FFT or DFT for the mixed signal;
7. performing an estimation or a measurement (e.g. RSRP or RSRQ) on carrier frequency F2;

In one embodiment, the estimate on carrier frequency F2 is obtained for inter-frequency interference mitigation purpose. In this embodiment, the following steps may be performed:
1. Storing the digital baseband signal in a buffer;
2. Playing back and digitally mixing the stored baseband signal to frequency align the signal to a sub-carrier grid according to carrier frequency F2 (if carrier frequency F2 is the one that should be cancelled);
3. Performing estimation steps where the signal for cell on carrier frequency F2 is estimated;
4. Digitally mixing the estimated signal to frequency align the estimated signal with a sub-carrier grid according to carrier frequency F1;
5. Subtracting the frequency adjusted estimated signal from the received stored baseband signal to determine an interference mitigated signal;
6. Further process the interference mitigated signal in order to obtain a measurement or detect information received in the signal on carrier frequency F1.

With the reused baseband signal, there is no need for new samples on carrier frequency F2, there may be no need to retune the receiver for the inter-frequency carrier frequency F2, and there is no need to retune the receiver to a larger bandwidth BW2 either. As a result, the wireless terminal 50 may be able to perform estimates or measurements on the inter-frequency carrier frequency F2 without measurement gaps (i.e., no need to involve network node, which currently configures measurement gaps; no interruptions or effective measurement time limitation typical for measurement gaps; possibility to receive the interfering signal and the measured signal at the same time, etc.), and/or in a shorter time (e.g., the measurement time requirement may be shorter than that for the non-overlapping inter-frequency), and/or with a higher accuracy (e.g., due to the possibility to better handle the interference from a signal transmitted on another frequency; an example of handling the interference is interference cancellation, suppression, or rejection).

The wireless terminal 50 may also be required to meet one or more requirements (e.g., measurement time requirement, measurement accuracy requirement, or requirement for an estimate obtained based on inter-frequency measurements such as a position accuracy obtained based on inter-frequency measurements, etc.), wherein the requirements may be different from inter-frequency requirements for scenarios when the wireless terminal 50 does not reuse the intra-frequency base band signal for inter-frequency.

In yet another embodiment, the embodiments described herein may be associated with a specific type of inter-frequency measurement or a specific purpose for which the measurement is performed. Some examples of measurements are as described in 36.214. Some example purposes are RRM, SON, MDT, positioning, interference handling, etc.

In yet another embodiment, the embodiments described herein may apply to a specific type of deployment, e.g., advanced heterogeneous and small cell deployments. The inter-frequency radio signal estimates or measurements on the overlapping part of the bandwidth may be performed according to embodiments described above, while being triggered or initiated, e.g., in one or more of the following ways:

In a best effort, without explicit request, e.g., upon resource availability or when the battery is above a threshold or the device is in an energy-saving mode, Upon a request from another node, Upon an event (e.g., cell change or wireless terminal 50 state change), When one or more conditions are met (e.g., when the interfered signal quality or SINR is below a threshold or the interfering signal strength is above a threshold, e.g., when the estimate is for the purpose of interference mitigation).

Not all wireless terminals 50 are capable of performing estimates or measurements on the overlapping part of the bandwidth on carrier frequency F2. According to another aspect of the disclosure, a wireless terminal 50 may therefore signal to a network node its capability related to its ability to perform such measurements. In one example, the capability may also be implicit in another capability or release indication (e.g., all devices in LTE Rel-12 have such capability). Some examples of the network nodes receiving the capability are: a base station such as an eNodeB, a control node, a positioning node, an MDT node, a SON node. This capability may be used by the receiving node, e.g., for configuring measurements, cell selection/reselection, measurement gap configuration, network management or RRM tasks (e.g., determining receiver/device types in the area), or building up assistance data for interference handling for the wireless terminal 50.

Also, not all wireless terminals 50 may be capable of handling the interference from carrier frequency F2 on the overlapping part of the bandwidths BW1 and BW2. According to another aspect of the disclosure, a wireless terminal 50 may therefore signal to another node this capability to another node. In one example, the capability may also be implicit in another capability or release indication (e.g., all devices in LTE Rel-12 have such capability or all devices capable of interference cancellation for intra-frequency may have such capability). Some examples of the nodes receiving the capability are: a base station such as an eNodeB, a network node, a positioning node, an MDT node, a SON node. This capability may be used by the receiving node, e.g., for configuring measurements, cell or carrier (re)selection, measurement gap configuration, network management or RRM tasks (e.g., determining receiver/device types in the area), or building up assistance data for interference handling for the wireless terminal 50.

The methods of obtaining an estimate or a measurement on the overlapping part of the bandwidth may also be complemented with other operations. Examples of such complementary operations include:

Determining the presence of transmissions on carrier frequency F2 interfering at a receiver to transmission on carrier frequency F1 within the overlapping part of bandwidths BW2 and BW1.

The determining may be performed by the wireless terminal 50 autonomously and/or with help from another node. The presence of interference from carrier frequency F2 may be determined by prior art methods or, e.g., by any one or more of:

Explicit indication from another node;

Estimating the interference or signal levels (on F1 and/or F2) and comparing to a threshold;

Comparing a metric (e.g., received signal quality, error rate, correlation result, etc.) associated with a transmission on carrier frequency F1 to a threshold;

Obtaining bandwidth BW2, e.g., by reading system information, and determining whether bandwidths BW2 and BW1 overlap;

Determination by ordinary cell search (as described above).

Obtaining the information related to transmission configuration on carrier frequency F2 and/or transmission configuration within the overlapping part of bandwidths BW2 and BW1. The information may be obtained from another node upon a request or in an unsolicited way, may be received in the assistance data, or determined autonomously (e.g., for "known" or common signals such as reference signals, synchronization signals, system information channel, etc.)

According to another aspect of the disclosure, a network node may request or configure measurements made by a wireless terminal 50. The network node, according to this aspect of the disclosure, determines that two different carrier frequencies F1 and F2 have bandwidths BW1 and BW2 respectively that overlap at least in part. The network node may, responsive to such determination, 1) determine whether a wireless terminal 50 is capable of performing inter-frequency measurements by re-using samples of an intra-frequency baseband signal; 2) request or configure a wireless terminal 50 to perform inter-frequency measurements on carrier frequency F2 in the portion of the bandwidth BW2 that overlaps with bandwidth BW1, and/or 3) receive an estimation or inter-frequency measurement for signals transmitted on carrier frequency F2 in the portion in the portion of the bandwidth BW2 that overlaps with bandwidth BW1.

The network node may determine the capabilities of the wireless terminal 50 based on signaling from another network node (e.g., serving BS or MME) or from the wireless terminal 50. In some embodiments, the capabilities of the wireless terminal 50 may be determined autonomously by analyzing measurements performed by the wireless terminal 50.

To configure inter-frequency measurements, the network node may 1) configure one or more timers associated with the inter-frequency measurements (e.g., since the measurement may be faster than inter-frequency with non-overlapping bandwidths, the corresponding timer may also be configured for a shorter time; 2) configure measurement parameters (e.g., measurement filter constant, measurement bandwidth, scaling factors, etc.) to enable the wireless terminal 50 to perform inter-frequency measurements on carrier frequency F2 in the portion of the bandwidth BW2 that overlaps with the bandwidth BW1; 3) indicate the possibility to the wireless terminal 50 of performing inter-frequency measurements on carrier frequency F2 in the portion of the bandwidth BW2 that overlaps with the bandwidth BW1; 4) provide the wireless terminal 50 with assistance data to assist it in performing inter-frequency measurements on carrier frequency F2 in the portion of the bandwidth BW2 that overlaps with the bandwidth BW1; and 5) configure reporting of the inter-frequency measurements by the wireless terminal 50 (e.g. configure wireless terminal 50 to report portion of bandwidth BW2 on which measurements are performed). Assistance data provided to the wireless terminal 50 may comprise, for example, frequency information related to carrier frequency F2, timing information related to radio signal transmissions on carrier frequency F2, frequency accuracy related to radio signal transmissions on carrier frequency F2, frequency shift between transmitter on carrier frequency F2 and transmitter on carrier frequency F1, expected or the maximum frequency shift at a receiver between signals on carrier frequency F2 and signals on carrier frequency F1, information or a set of indicators describing the part of the bandwidth BW2 for measurements on carrier frequency F2, and a receiver configuration (e.g., filter-related parameters).

Figure 9:
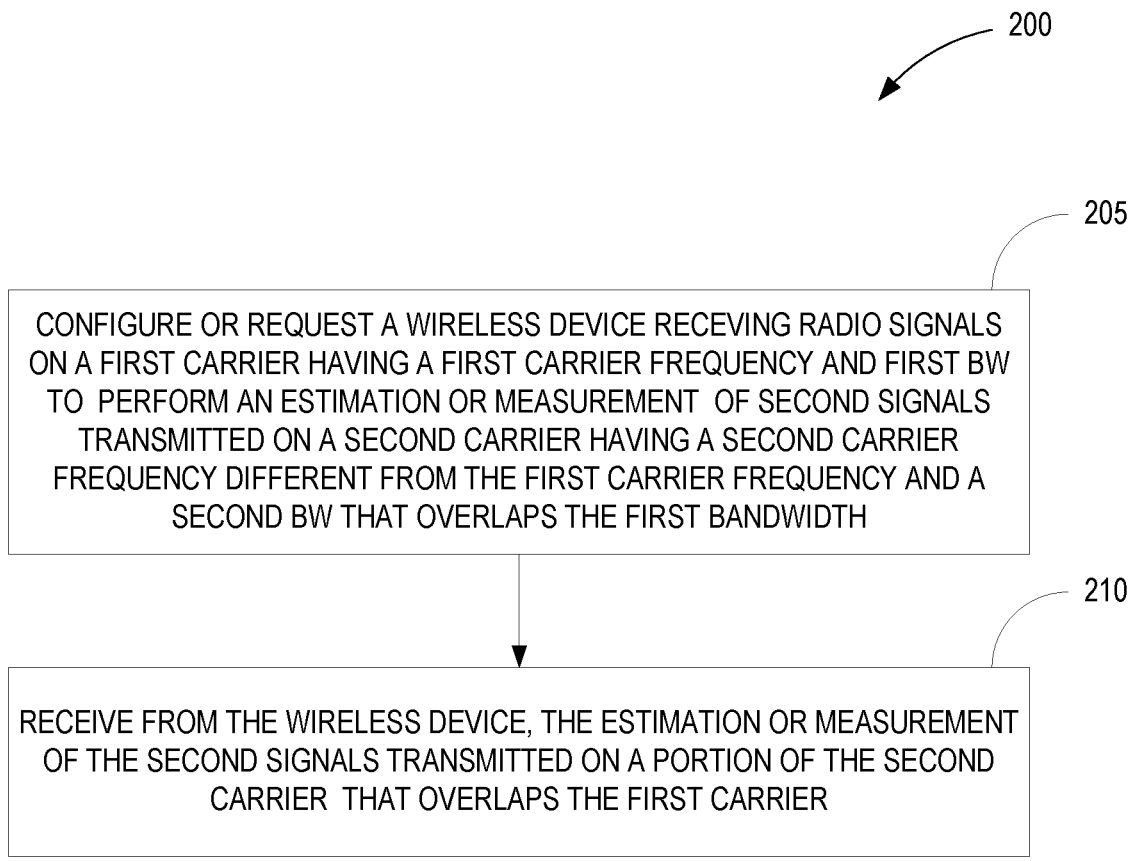
FIG. 9 illustrates a method implemented by a network node of configuring or requesting a wireless terminal to perform inter-frequency measurements.

FIG. 9 illustrates an exemplary method 200 performed by a network node, which may comprise a radio node (e.g., base station 25) or a control node (e,g, ICF node). The network node configures or requests a wireless terminal 50 receiving first signals on a first carrier frequency F1 with bandwidth BW1 to perform inter-frequency measurements on a second carrier frequency F2 different from the first carrier frequency F1 and having a bandwidth BW2 that overlaps with the first bandwidth BW1 (block 205). The network node receives the inter-frequency measurements of the second signals performed by the wireless terminal 50 on the portion of the second carrier frequency F2 that overlaps with the first carrier frequency F1 (block 210).

The inter-frequency measurements may be configured by the network node for a specific purpose, e.g., RRM, mobility, positioning, MDT, SON, interference coordination, channel estimation and feedback, etc., or for a specific activity state (e.g., IDLE or CONNECTED) or transparent to the activity state. The network node may then receive the measurements performed on a part of bandwidth BW2. The measurements may be used by the network for any purpose, e.g., RRM, mobility, interference coordination, SON, antenna configuration optimization, network planning, etc.

In some embodiments, the network node may also configure inter-frequency mobility parameters and/or carrier switching.

Figure 10:
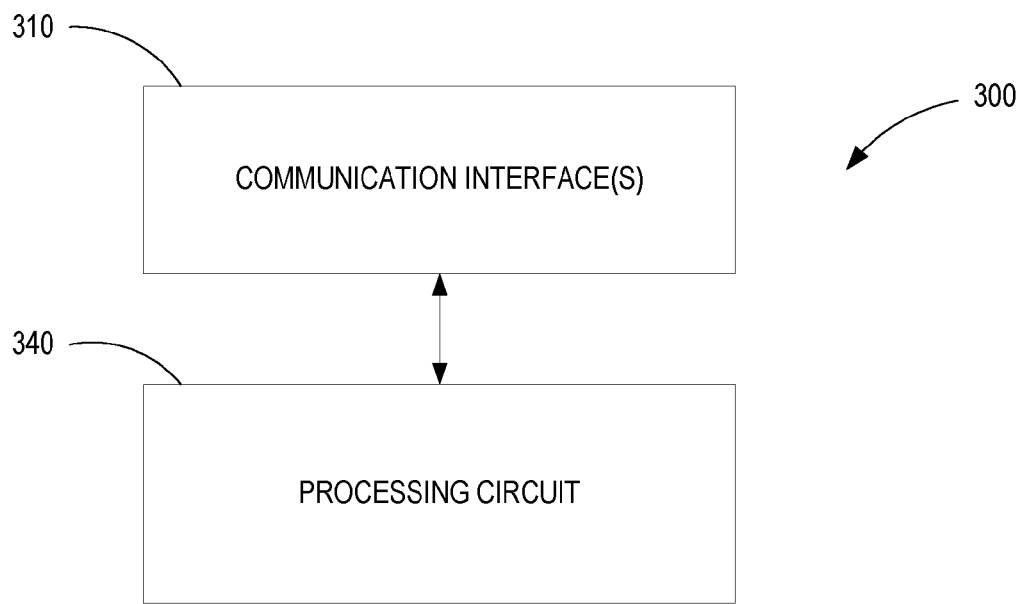
FIG. 10 illustrates the main functional elements of a network node.

FIG. 10 below illustrates an exemplary network node 300 configured to perform the methods as herein described. The network node 300 comprises one or more communication interfaces 310 for communicating with other network node and/or wireless terminals. In some embodiments, the network node 300 comprises a control node in a core network or RAN and the communication interfaces 310 comprise a network interface 320 for communicating with other network nodes, such a radio nodes and other control nodes. In some embodiments, the network node 300 comprises a base station 25 and the one or more communication interfaces 310 comprise a network interface 320 for communicating with other network nodes and a transceiver circuit 330 for communicating with wireless terminals 50. The transceiver circuits may operate according to the LTE Release 10 standard, or other communication standard. The network node 300 further includes one or more processing circuits 340 configured to perform the methods shown and described herein. The processing circuits 340 may comprise one or more processors, hardware, firmware, or a combination thereof. In one exemplary embodiment, the processing circuits are configured to determine a set of radio resources used for the transmission of second signals on a second carrier having a second carrier frequency and second bandwidth that interfere with first signals transmitted on a first carrier having a first carrier frequency different from the second carrier frequency and first bandwidth. The set of radio resources are within a portion of the second bandwidth that overlaps with the first bandwidth. The processing circuits 340 are further configured to control or adjust a transmission configuration for one or more of the second signals to reduce the interference of the second signals with the first signals.

Figure 11:
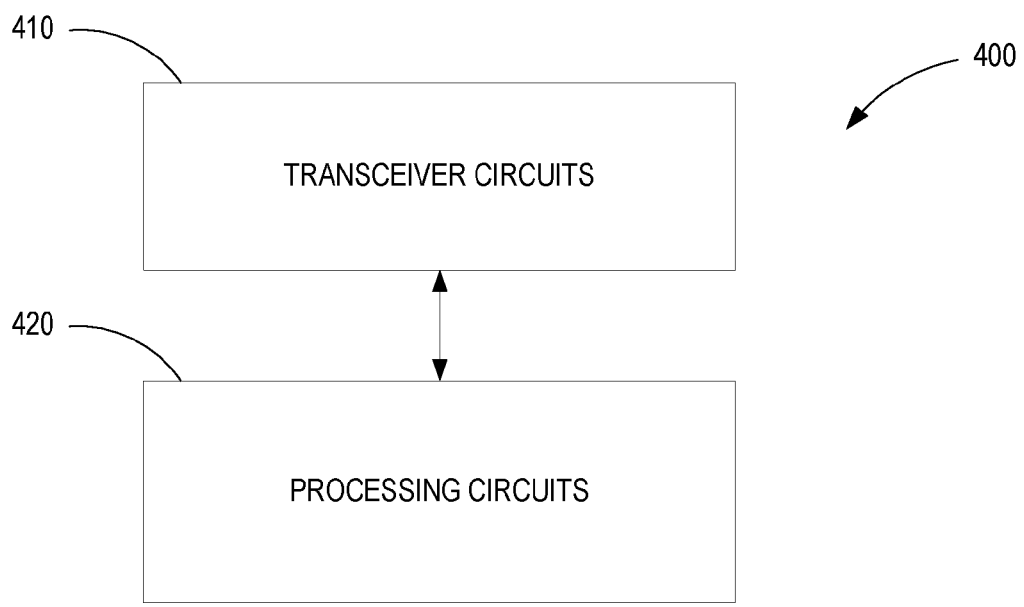
FIG. 11 illustrates the main functional elements of a wireless terminal.

FIG. 11 illustrates a wireless terminal 400 according to one or more embodiments. The wireless terminal 400 comprises transceiver circuits 410 for communicating with base stations 25 in a wireless communication network 10 and processing circuits 420 connected to said transceiver circuits. The transceiver circuits 410 may operate according to the LTE Release 10 standard or other communication standard. The processing circuits 420 may comprise one or more processors, hardware, firmware, or a combination therefore. The processing circuits are configured to perform the methods and procedures implemented by the wireless terminal 50 herein described. In one embodiment, the processing circuits 420 are configured to determine a set of radio resources used for the transmission of second signals on a second carrier having a second carrier frequency and second bandwidth that interfere with first signals transmitted on a first carrier having a first carrier frequency different from the second carrier frequency and first bandwidth, said set of radio resources being within a portion of the second bandwidth that overlaps with the first bandwidth. The processing circuits 420 are further configured to obtain samples of a received signal received on said set of radio resources, and to measure or estimate a parameter associated with one or more of said second signals based on said samples.

What is claimed is:

1. A method implemented in a first network node, the method comprising:
   determining, by processing circuits of the first network node, a set of radio resources used for transmission of second signals on a second carrier having a second carrier frequency and second bandwidth that interfere with first signals transmitted on a first carrier having a first carrier frequency different from the second carrier frequency and first bandwidth, the set of radio resources being within a portion of the second bandwidth that overlaps with the first bandwidth;
   controlling or adjusting a transmission configuration for one or more of the second signals to reduce the interference of the second signals with the first signals in the determined set of radio resources, wherein the controlling or adjusting of the transmission configuration for one or more of the second signals comprises rescheduling one or more of the second signals to avoid interference with the first signals.

2. The method of claim 1, wherein the controlling or adjusting a transmission configuration is performed by the network node in response to an indication from a wireless terminal or another network node of the need to reduce interference caused by the second signals.

3. The method of claim 1, wherein the determining the set of radio resources comprises determining the set of radio resources based on assistance data received from a from a wireless terminal or another network node, wherein the assistance data comprises information about the transmission configuration of a second network node or timing of transmissions by the second network node.

4. The method of claim 1, wherein the determining the set of radio resources comprises determining the set of radio resources based on radio transmissions received from a second network node.

5. The method of claim 1, wherein the controlling or adjusting a transmission configuration for one or more of the second signals comprises reducing a transmit power.

6. The method of claim 5, wherein reducing the transmit power comprises reducing the transmit power for second signals comprising data and control signals but not for second signals comprising reference signals and synchronization signals.

7. The method of claim 1, wherein the controlling or adjusting a transmission configuration for one or more of the second signals comprises muting one or more of the second signals.

8. A network node comprising:
a network interface for communicating with other network nodes; and
processing circuits connected to the network interface, the processing circuits configured to:
determine a set of radio resources used for the transmission of second signals on a second carrier having a second carrier frequency and second bandwidth that interfere with first signals transmitted on a first carrier having a first carrier frequency different from the second carrier frequency and first bandwidth, the set of radio resources being within a portion of the second bandwidth that overlaps with the first bandwidth;
control or adjust a transmission configuration for one or more of the second signals to reduce the interference of the second signals with the first signals in the determined set of radio resources by rescheduling one or more of the second signals to avoid interference with the first signals.

9. The network node of claim 8, wherein the processing circuits are configured to control or adjust a transmission configuration for one or more of the second signals responsive to an indication from a wireless terminal or another network node of the need to reduce interference caused by the second signals.

10. The network node of claim 8, wherein the processing circuits are configured to determine a set of radio resources by determining the set of radio resources assistance data received from a from a wireless terminal or another network node, wherein the assistance data comprises information about the transmission configuration of a second network node, or the timing of transmission by the second network node.

11. The network node of claim 8, wherein the processing circuits are configured to determine the set of radio resources based on radio transmissions received from a second network node.

12. The network node of claim 8, wherein the processing circuits are configured to control or adjust a transmission configuration for one or more of the second signals by reducing the transmit power of one or more of the second signals.

13. The network node of claim 12, wherein the processing circuits are further configured to reduce the transmit power for second signals comprising data and control signals but not for second signals comprising reference signals and synchronization signals.

14. The network node of claim 8, wherein the processing circuits are configured to control or adjust a transmission configuration for one or more of the second signals by muting one or more of the second signals.

15. The network node of claim 8, wherein the network node comprises a base station.

16. The network node of claim 8, wherein the network node comprises a core network node.

* * * * *